(12) United States Patent
Ichinose et al.

(10) Patent No.: US 9,718,928 B2
(45) Date of Patent: Aug. 1, 2017

(54) BLOCK COPOLYMER AND PRODUCTION METHOD OF THE SAME

(71) Applicant: TORAY INDUSTRIES, INC., Tokyo (JP)

(72) Inventors: Keiko Ichinose, Nagoya (JP); Makito Yokoe, Nagoya (JP); Daisuke Yamamoto, Nagoya (JP); Koji Yamauchi, Nagoya (JP); Kohei Yamashita, Nagoya (JP)

(73) Assignee: TORAY INDUSTRIES, INC., Tokyo (JP)

(*) Notice: Subject to any disclaimer, the term of this patent is extended or adjusted under 35 U.S.C. 154(b) by 0 days.

(21) Appl. No.: 14/770,382

(22) PCT Filed: Mar. 5, 2014

(86) PCT No.: PCT/JP2014/001207
§ 371 (c)(1),
(2) Date: Aug. 25, 2015

(87) PCT Pub. No.: WO2014/136448
PCT Pub. Date: Sep. 12, 2014

(65) Prior Publication Data
US 2016/0009868 A1    Jan. 14, 2016

(30) Foreign Application Priority Data

Mar. 6, 2013  (JP) ................. 2013-044004
Mar. 6, 2013  (JP) ................. 2013-044005
Sep. 30, 2013  (JP) ................. 2013-204070

(51) Int. Cl.
| | |
|---|---|
| C08G 81/00 | (2006.01) |
| C08G 75/14 | (2006.01) |
| C08G 69/14 | (2006.01) |
| C08L 71/00 | (2006.01) |
| C08G 69/42 | (2006.01) |
| C08G 69/48 | (2006.01) |

(52) U.S. Cl.
CPC .......... *C08G 81/00* (2013.01); *C08G 69/14* (2013.01); *C08G 69/42* (2013.01); *C08G 69/48* (2013.01); *C08G 75/14* (2013.01); *C08L 71/00* (2013.01); *C08G 2261/126* (2013.01); *C08G 2650/40* (2013.01)

(58) Field of Classification Search
None
See application file for complete search history.

(56) References Cited

U.S. PATENT DOCUMENTS

| | | | |
|---|---|---|---|
| 4,678,831 | A | 7/1987 | Kawabata et al. |
| 4,769,424 | A | 9/1988 | Takekoshi et al. |
| 4,997,894 | A | 3/1991 | Teegarden |
| 5,262,517 | A | 11/1993 | Sato et al. |
| 5,331,029 | A | 7/1994 | Sato et al. |
| 5,384,391 | A | 1/1995 | Miyata et al. |
| 6,080,822 | A | 6/2000 | Haubs et al. |
| 2009/0234068 | A1 | 9/2009 | Horiuchi et al. |
| 2013/0225771 | A1 | 8/2013 | Kanomata et al. |
| 2013/0261229 | A1 | 10/2013 | Sano et al. |

FOREIGN PATENT DOCUMENTS

| | | | |
|---|---|---|---|
| EP | 038167 | A2 | 8/1990 |
| JP | 61-225218 | A | 10/1986 |
| JP | 64-45433 | A | 2/1989 |
| JP | 2-133428 | A | 5/1990 |
| JP | 2-228325 | A | 9/1990 |
| JP | 2-235929 | A | 9/1990 |
| JP | 4-505182 | A | 9/1992 |
| JP | 4-311725 | A | 11/1992 |
| JP | 5-105757 | A | 4/1993 |
| JP | 5-163349 | A | 6/1993 |
| JP | 5-295346 | A | 11/1993 |
| JP | 5-301962 | A | 11/1993 |
| JP | 11-222527 | A | 8/1999 |
| JP | 2004-168834 | A | 6/2004 |
| JP | 2004-182753 | A | 7/2004 |
| JP | 2008-231291 | A | 10/2008 |
| WO | WO 2007/034800 | A1 | 3/2007 |
| WO | WO 2012/057319 | A1 | 5/2012 |
| WO | WO 2012/081455 | A1 | 6/2012 |

OTHER PUBLICATIONS

International Search Report, issued in PCT/JP2014/001207, dated Jun. 10, 2014.
Kuang et al., "Syntheses and Characterization of Poly(phenylene sulfide)-Poly(ether sulfone) Block Copolymers," Journal of Applied Polymer Science, vol. 61, No. 9, Aug. 29, 1996, pp. 1607-1614, XP000634601.

*Primary Examiner* — Ana Woodward
(74) *Attorney, Agent, or Firm* — Birch, Stewart, Kolasch & Birch, LLP

(57) ABSTRACT

A block comprised of a copolymer is obtained by ring-opening polymerization of a cyclic polyarylene sulfide, so that a block copolymer is produced to have a maximum peak molecular weight measured by size exclusion chromatography (SEC) in a range of not less than 2,000 and less than 2,000,000 and have a unimodal molecular weight distribution in this range.

10 Claims, No Drawings

BLOCK COPOLYMER AND PRODUCTION METHOD OF THE SAME

TECHNICAL FIELD

The present application claims priority from Japanese Patent Applications No. 2013-044004 and No. 2013-044005 filed on Mar. 6, 2013 and Japanese Patent Application No. 2013-204070 filed on Sep. 30, 2013, the entirety of disclosures of which is hereby incorporated by reference into this application.

The invention relates to a block copolymer. More specifically, the invention relates to a polyarylene sulfide copolymer prepared from a cyclic polyarylene sulfide as raw material and a production method of the same.

BACKGROUND ART

A polyarylene sulfide (hereinafter may be abbreviated as PAS) is a resin having favorable characteristics as engineering plastic, such as excellent heat resistance, barrier property, chemical resistance, moist heat resistance and flame retardancy. Especially a polyphenylene sulfide (hereinafter may be abbreviated as PPS) is moldable to various molded parts, films, sheets, fibers and the like by injection molding or extrusion molding and are widely used in fields requiring heat resistance and chemical resistance, such as various electric and electronic parts, mechanical parts and automobile parts.

The PPS resin, however, has poorer impact resistance, toughness and molding processability than engineering plastics such as nylon, polycarbonate and polybutylene terephthalate. In order to solve these properties, compounding with different polymers has been tried conventionally. Typical compounding techniques include a method of blending PAS with another different polymer to produce a polymer alloy and a method of producing a block copolymer by chemical bonding of PAS with a different polymer. Among them, block copolymerization allows for formation of the more homogeneous and finer phase separated structure than the other compounding techniques and has thus been extensively studied as the PPS modifying technique. For example, Patent Document 1 discloses a PPS copolymer including a polysulfone component block. This copolymer has the better bending strength and impact resistance, compared with a simple blended mixture. This copolymer is produced by a technique of first synthesizing a polysulfone having chloro groups at both terminals and subsequently performing polycondensation of PPS in the presence of the polysulfone having chloro terminal groups. This technique, however, has a problem that generation and contamination of a homopolymer and non-conformity of block composition distribution are inevitable in principle. There is accordingly still a problem to obtain a homogeneous copolymer.

Other disclosed copolymerization components with PPS include, for example, polyphenylene sulfide ketone (Patent Documents 2 and 3), polyether sulfone (see, for example, Patent Document 4 and Non-Patent Document 1), polysulfide sulfone (see, for example, Patent Document 5), poly(phenylene ether ether ketone) (see, for example, Patent Documents 6 and 7), polyether imide (see, for example, Patent Document 8), liquid crystalline polyester (see, for example, Patent Document 9 and Non-Patent Document 2) and polyester (see, for example, Patent Documents 10 and 11). Any of copolymers including these copolymerization components may be produced by a method of copolymerization by polycondensation of different polymers in the presence of a homopolymer of PPS or a copolymerization component other than PPS having functional terminal groups or by a method of copolymerization by linking polymer terminals. Such methods leave the problem of generation and contamination of the homopolymer and non-uniformity of the block composition in principle.

Patent Document 12 discloses a copolymer with a polyacrylate as a PPS component block-containing copolymer. According to the disclosure of this document, heating a PPS partially having disulfide bonding and an acrylate in the presence of a radical initiator causes a radical chain transfer reaction to the disulfide bonding, so as to obtain a copolymer of PPS and a polyarylate. This technique, however, does not solve the problem with regard to contamination of the homopolymer and the block composition and requires a purification operation for removal of the homopolymer. Additionally, this technique has may other problems in industrial application, such as the poor stability of the disulfide bonding.

In order to solve the problems with regard to the copolymer described above and produce the more homogeneous copolymer, there is a need to obtain a PPS component block or a copolymerization component block other than the PPS component block having the narrower molecular weight distribution than those produced by the conventional techniques. A technique disclosed for production of PPS having the narrower molecular weight distribution is a method using a cyclic arylene sulfide oligomer as raw material and themial polymerization in the presence of or in the absence of a catalyst or an initiator (see, for example, Patent Documents 13 to 15). According to the disclosures of these documents, using the cyclic arylene sulfide oligomer as the raw material allows for production of PPS having the narrower molecular weight distribution, compared with PPS produced by polycondensation. There is, however, no disclosure with regard to the characteristics of a copolymer using this PPS as the component block and its production method.

PRIOR ART DOCUMENTS

Patent Documents

[Patent Document 1] JP S61-225218A
[Patent Document 2] JP H02-133428A
[Patent Document 3] JP H02-229857A
[Patent Document 4] JP 2004-168834A
[Patent Document 5] JP H02-235929A
[Patent Document 6] JP H02-228325A
[Patent Document 7] JP 2004-168834A
[Patent Document 8] JP S64-045433A
[Patent Document 9] JP H11-222527A
[Patent Document 10] JP H04-311725A
[Patent Document 11] JP H05-295346A
[Patent Document 12] JP H04-505182A
[Patent Document 13] JP H05-163349A
[Patent Document 14] JP H05-301962A
[Patent Document 15] WO 2007/034800

Non-Patent Documents

[Non-Patent Document 1] Journal of Applied Polymer Science, vol. 61, 1607 to 1614 pages, 1996
[Non-Patent Document 2] Journal of Polymer Science Part A: Polymer Chemistry, Vol. 36, 2707 to 2713 pages, 1998

SUMMARY OF THE INVENTION

Problems to be Solved by the Invention

An object is to provide a copolymer that has a unimodal molecular weight distribution and includes a polyarylene sulfide component block having a homogeneous composition distribution, as well as to provide a technique of producing such a copolymer.

Means for Solving the Problems

The inventors have achieved the present invention as the result of intensive study to solve the problems described above. Accordingly, the invention may be actualized by the following aspects, in order to solve at least part of the problems described above.

(1) There is provided a block copolymer that comprises, as a block comprised of the block copolymer, a polyarylene sulfide component block prepared from a cyclic polyarylene sulfide as raw material, wherein a remaining block comprised of the block copolymer uses a cyclic compound as raw material.

(2) There is provided the block copolymer according to (1) above, wherein the cyclic polyarylene sulfide is a cyclic polyphenylene sulfide expressed by general formula (i) given below:

[Chem. 1]

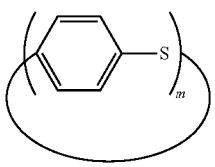

(i)

where m is an integral number of 4 to 50, and the cyclic polyphenylene sulfide is either a cyclic polyphenylene sulfide having a single number m or a mixture of multiple different cyclic polyphenylene sulfides having different numbers m.

(3) There is provided the block copolymer according to either (1) or (2) above, wherein the polyarylene sulfide component block is a polyphenylene sulfide component block expressed by general formula (ii) given below:

[Chem. 2]

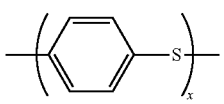

(ii)

wherein the remaining block is at least one polymer component block selected from the group consisting of a polyamide, a polyester, a polycarbonate, a polysulfone and a poly(phenylene ether ether ketone), where x is an integral number of not less than 1.

(4) There is provided the block copolymer according to (3) above, wherein the remaining block contains a poly(phenylene ether ether ketone) component block prepared from a cyclic poly(phenylene ether ether ketone) expressed by general formula (iii) given below as raw material:

[Chem. 3]

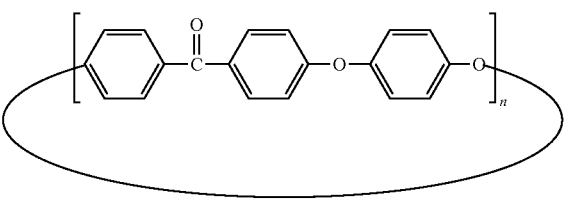

(iii)

where n is an integral number of 2 to 40, and the cyclic poly(phenylene ether ether ketone) is either a cyclic poly(phenylene ether ether ketone) having a single number n or a mixture of multiple different cyclic poly(phenylene ether ether ketone)s having different numbers n.

(5) There is provided the block copolymer according to (3) above that comprises 5 to 95% by weight of the polyphenylene sulfide component block expressed by the general formula (ii) and 95 to 5% by weight of at least one polymer component block selected from the group consisting of a polyamide, a polyester, a polycarbonate, a polysulfone and a poly(phenylene ether ether ketone).

(6) There is provided a polyphenylene sulfide-poly(phenylene ether ether ketone) block copolymer according to (5) above that comprises 5 to 95% by weight of the polyphenylene sulfide component block expressed by the general formula (ii) and 95 to 5% by weight of a poly(phenylene ether ether ketone) component block expressed by general formula (iv) given below:

[Chem. 4]

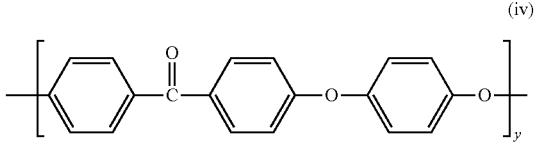

(iv)

(where y is an integral number of not less than 1.)

(7) There is provided the block copolymer according to any one of (1) to (6) above that has a maximum peak molecular weight measured by size exclusion chromatography (SEC) in a range of not less than 2,000 and less than 2,000,000 and has a unimodal molecular weight distribution in this range.

(8) There is provided a production method of a block copolymer comprising (a) step of ring-opening polymerization of a cyclic polyarylene sulfide in the presence of an initiator; and (b) step of ring-opening polymerization of a cyclic compound different from the cyclic polyarylene sulfide in the presence of an initiator, wherein one step out of the step (a) and the step (b) is performed with mixing a product obtained in the other step with the cyclic compound used as raw material in one step.

(9) There is provided the production method of the block copolymer according to (8) above, wherein the cyclic compound used in the step (b) is one cyclic compound selected from the group consisting of a cyclic amide, a cyclic ester, a cyclic polycarbonate, a cyclic polysulfone and a cyclic poly(phenylene ether ether ketone).

(10) There is provided the production method of the block copolymer according to either (8) or (9) above, wherein the one step is the step (a).

(11) There is provided the production method of the block copolymer according to (10) above, wherein the cyclic compound used in the step (b) is a cyclic poly(phenylene ether ether ketone).

(12) There is provided the production method of the block copolymer according to either (8) or (9) above, wherein the one step is the step (b).

(13) There is provided the production method of the block copolymer according to (12) above, wherein the cyclic compound used in the step (b) is at least one selected from the group consisting of a cyclic amide, a cyclic ester, a cyclic polycarbonate and a cyclic polysulfone.

(14) There is provided the production method of the block copolymer according to any one of (8) to (13) above, wherein the initiator used in the one step is a metal salt.

(15) There is provided the production method of the block copolymer according to any one of (8) to (14) above, wherein the ring-opening polymerization proceeding in the step (a) and the step (b) is anionic ring-opening polymerization.

Advantageous Effects of Invention

The present invention provides a block copolymer that does not include a homopolymer but includes a homogeneous polyarylene sulfide component block having a unimodal molecular weight distribution.

MODE FOR CARRYING OUT THE INVENTION

The following describes embodiments of the invention.

A block copolymer according to an embodiment of the invention includes at least two polymer component blocks, and at least one of them is a polyarylene sulfide component block prepared from a cyclic polyarylene sulfide as raw material.

The "polyarylene sulfide component block" comprised of the copolymer according to the embodiment of the invention is a component block comprised of the block copolymer and more specifically denotes a component block having substantially the ring-opened structure of the cyclic polyarylene sulfide as the repeating unit of this component block. The number of repetitions of the polyarylene sulfide component block is not especially specified but is, for example, equal to or more than 1, is preferably equal to or more than 2 and is especially preferably equal to or more than 5. This number of repetitions is also, for example, equal to or less than 10,000, is preferably equal to or less than 8,000 and is especially preferably equal to or less than 5,000. This number of repetitions is adjustable by a molar ratio of the cyclic polyarylene sulfide as the raw material to a polymerization initiator and/or a catalyst in manufacture of the polyarylene sulfide component block described later. This number of repetitions is given as a value by dividing the polystyrene-equivalent number-average molecular weight of the polyarylene sulfide component block having a known absolute molecular weight, which is determined by size exclusion chromatography (SEC) using a solvent that is capable of dissolving polyarylene sulfide as an eluent, by the molecular weight of the repeating unit of the polyarylene sulfide component block.

The content of the polyarylene sulfide component block included in the copolymer according to the embodiment of the invention is preferably equal to or more than 5% by weight and is more preferably equal to or more than 10% by weight relative to the entire copolymer. This content is also preferably equal to or less than 95% by weight and is more preferably equal to or less than 90% by weight. The content in this range is more likely to produce a homogeneous copolymer and exert the characteristics derived from the polyarylene sulfide component block, such as high chemical resistance.

A "component block other than the polyarylene sulfide component block" described in the embodiment of the invention is a component block comprised of the block copolymer and more specifically denotes a component block having the ring-opened structure of a cyclic compound other than the cyclic polyarylene sulfide as the repeating unit of this component block.

In the copolymer according to the embodiment of the invention, the polyarylene sulfide component block and the other component blocks may be linked via a structure other than the repeating units of the respective blocks. In another example, terminal structures derived from the repeating units of the respective blocks may be linked directly. In another example, a plurality of blocks having an identical repeating unit may be present in an identical copolymer molecule.

The cyclic polyarylene sulfide as the raw material of the polyarylene sulfide component block comprised of the copolymer according to the embodiment of the invention is a cyclic compound having a repeating unit expressed by a formula —(Ar—S)— (where Ar represents arylene group) as the primary structural unit. This cyclic compound preferably contains 80 mol % or more of this repeating unit. Ar may be, for example, any units expressed by Formulae (A) to (K); and Formula (A) is especially preferable.

[Chem. 5]

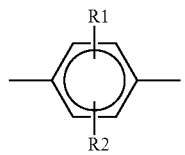
(A)

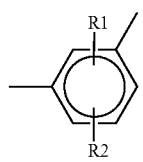
(B)

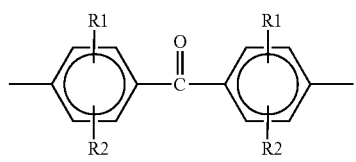
(C)

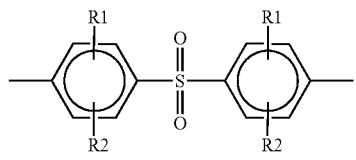
(D)

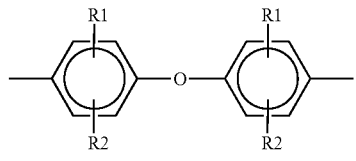
(E)

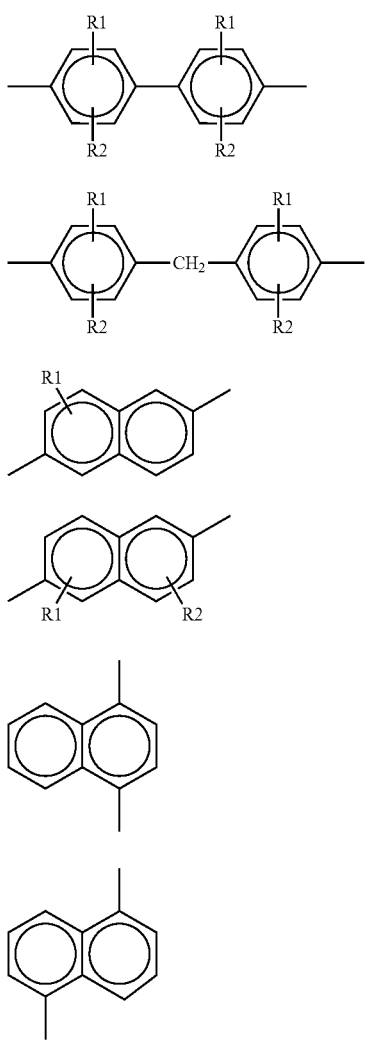

(where each of R1 and R2 represents a substituent selected from the group consisting of hydrogen, 1 to 12 carbon atom-containing alkyl groups, 1 to 12 carbon atom-containing alkoxy groups, 6 to 24 carbon atom-containing arylene groups and halogen groups, and R1 and R2 may be identical with each other or may by different from each other.)

The cyclic polyarylene sulfide may include a small amount of a branch unit or a crosslinking unit expressed by any of Formulae (L) to (N) given below as long as the cyclic polyarylene sulfide has the above repeating unit as the primary structural unit. The amount of copolymerization of this branch unit or crosslinking unit is preferably in the range of 0 to 1 mol % relative to 1 mol of the —(Ar—S)— unit.

[Chem. 6]

—(Ar—S)—    (L)
   \
    S—

—(Ar—S)—    (M)
   \
    O—

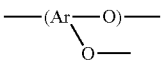    (N)

<Cyclic Polyphenylene Sulfide>

The especially preferable cyclic polyarylene sulfide is a cyclic polyphenylene sulfide (hereinafter may be abbreviated as cyclic PPS) including not less than 80 mol % or preferably not less than 90 mol % of a p-phenylene sulfide unit as the primary structural unit. The cyclic polyphenylene sulfide herein is a monomer or a mixture of a cyclic compound expressed by General Formula (v) given below. The cyclic PPS includes at least not less than 50% by weight of, preferably not less than 70% by weight, more preferably not less than 80% by weight or furthermore preferably not less than 90% by weight of the cyclic compound of Formula (v).

[Chem. 7]

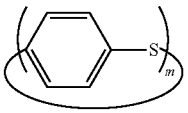    (v)

The number of repetitions m in the above Formula (v) indicating a compound included in the cyclic PPS is not specifically limited, but m is preferably not less than 4 and is more preferably not less than 8. Cyclic compounds having m of not greater than 7 are likely to have low reactivity. It is thus advantageous to set m to be not less than 8, in terms of obtaining the polyphenylene sulfide component block in a short time. The number of repetitions m is also preferably not greater than 50, is more preferably not greater than 25 and is furthermore preferably not greater than 15. As described later, it is preferable to perform conversion of the cyclic PPS into the polyphenylene sulfide component block by heating at a temperature equal to or higher than a melting temperature of the cyclic PPS. An increase in m is likely to increase the melting temperature of the cyclic PPS. It is thus advantageous to set m to the above range, in terms of allowing for conversion of the cyclic PPS to the polyphenylene sulfide component block at the lower temperature.

The cyclic compound of the above Formula (v) included in the cyclic PPS may be either a single compound having a single number of repetitions or a mixture of cyclic compounds having different numbers of repetitions. The mixture of the cyclic compounds having the different numbers of repetitions is, however, likely to have a lower melting temperature than the single compound having the single number of repetitions. It is thus preferable to use the mixture of the cyclic compounds having the different numbers of repetitions, in terms of decreasing the temperature of conversion into the polyphenylene sulfide component block to the lower temperature.

A polyphenylene sulfide oligomer is especially preferable as the component other than the cyclic compound of the above Formula (v) in the cyclic PPS. The polyphenylene sulfide oligomer is an oligomer having a repeating unit expressed by a formula -(Ph-S)— (where Ph represents phenylene group) as the primary structural unit and is preferably a linear homo-oligomer or a co-oligomer containing 80 mol % or more of this repeating unit. The polyphenylene sulfide oligomer may include a small amount of a branch unit or a crosslinking unit. The amount of copolymerization of this branch unit or crosslinking unit is preferably in the range of 0 to 1 mol % relative to 1 mol of the -(Ph-S)— unit. The polyphenylene sulfide oligomer may be any of a random copolymer including the above repeating unit, a block copolymer including the above repeating unit and mixtures thereof. The molecular weight of the polyphenylene sulfide oligomer is not specifically limited but is preferably lower than 10,000 as the weight-average molecular weight.

The upper value of the molecular weight of the cyclic PPS used for production of the polyphenylene sulfide component block according to the embodiment of the invention is preferably not higher than 10,000, is more preferably not higher than 5,000 and is furthermore preferably not higher than 3,000 as the weight-average molecular weight. The lower limit is, on the other hand, preferably not lower than 300, is more preferably not lower than 400 and is furthermore preferably not lower than 500 as the weight-average molecular weight. The cyclic PPS having the weight-average molecular weight in the above range is more likely to be converted into a polyarylene sulfide component block, from the standpoints of the melt viscosity and the ring configuration. This cyclic polyphenylene sulfide may be produced, for example, by a technique disclosed in WO 2008/105438.

<Cyclic Compound Other than Cyclic PPS>

The cyclic compound used as the raw material of the component block other than the polyphenylene sulfide component block may be a cyclic polymer or oligomer having a repeating unit or a low-molecular cyclic compound such as lactam or lactone. For example, cyclic polyamide, polyester, polyacetal, polycarbonate, polyphenylene ether, polyarylate, polysulfone, polyketone, polyimide, polyamide imide, polyether imide, polyurethane, polyurea, poly(phenylene ether ether ketone) and their derivatives are preferably used as the cyclic polymer. Among them, more preferable are lactam, lactone and cyclic polyamide, polyester, polycarbonate, polysulfone and poly(phenylene ether ether ketone). The molecular weight of the cyclic polymer or oligomer used is not specifically limited, but is preferably lower than 100,000, is more preferably lower than 50,000 and is furthermore preferably not higher than 10,000 as the number-average molecular weight, from the standpoint of the melt viscosity of the cyclic compound used or the melt viscosity of the resulting copolymer.

The cyclic amide used according to the embodiment of the invention is not specifically limited but may be any cyclic compound having an amide bond as the ring-forming bond. Available examples of the cyclic amide include lactams such as ε-caprolactam, ω-heptalactam, ω-octalactam, ω-undecalactam and ω-laurolactam, cyclic polyhexamethylene adipamide, cyclic polypentamethylene adipamide, cyclic polyhexamethylene sebacamide, cyclic polyhexamethylene dodecanamide, cyclic polyhexamethylene terephthalamide, cyclic polyhexamethylene isophthalamide, cyclic polyxylylene adipamide, cyclic polymers thereof and mixtures thereof. Any of these cyclic amides may have a substituent group. Among them, preferable are ε-caprolactam, ω-undecalactam and ω-laurolactam.

The cyclic ester is not specifically limited but may be any cyclic compound having an ester bond as the ring-forming bond. Available examples of the cyclic ester include ε-caprolactone, δ-valerolactone, γ- and β-butyrolactone, propiolactone, undecalactone, 1,5-oxepan-2-one, lactide, glycolide, cyclic polyethylene terephthalate, cyclic polypropylene terephthalate, cyclic polybutylene terephthalate, cyclic polycyclohexane dimethylene terephthalate, cyclic polyhexylene terephthalate, cyclic polyethylene isophthalate, cyclic polypropylene isophthalate, cyclic polybutylene isophthalate, cyclic polycyclohexane dimethylene isophthalate, cyclic polyhexylene isophthalate, cyclic polyethylene naphthalate, cyclic polypropylene naphthalate, cyclic polybutylene naphthalate, cyclic polyethylene terephthalate/5-sodium sulfoisophthalate, cyclic polyethylene terephthalate/polyethylene glycol, cyclic polypropylene terephthalate/polyethylene glycol, cyclic polybutylene terephthalate/polyethylene glycol, cyclic polyethylene terephthalate/polytetramethylene glycol, cyclic polypropylene terephthalate/polytetramethylene glycol, cyclic polypropylene terephthalate/polytetramethylene glycol, cyclic polybutylene terephthalate/polytetramethylene glycol, cyclic polyethylene oxalate, cyclic polypropylene oxalate, cyclic polybutylene oxalate, cyclic polyethylene succinate, cyclic polypropylene succinate, cyclic polybutylene succinate, cyclic polyethylene adipate, cyclic polypropylene adipate, cyclic polybutylene adipate, cyclic poly(neopentyl glycol adipate), cyclic polyethylene sebacate, cyclic polypropylene sebacate, cyclic polybutylene sebacate and cyclic copolymers and cyclic mixtures thereof. Any of these cyclic esters may have a substituent group. Among them, preferably used are ε-caprolactone, β-butyrolactone, lactide, glycolide and cyclic polyalkylene terephthalates such as cyclic polyethylene terephthalate, cyclic polypropylene terephthalate and cyclic polybutylene terephthalate. These cyclic polyalkylene terephthalates may be produced by, for example, a method disclosed in JP 2003-82081A. Especially, cyclic polybutylene terephthalate may be a commercially available product CBT (registered trademark) manufactured by Cyclics Corporation.

The cyclic polycarbonate is a cyclic compound having a carbonate bond as the ring-forming bond. Examples of such compound used according to the embodiment of the invention include aliphatic cyclic carbonates such as ethylene carbonate and propylene carbonate and their derivatives, and cyclic polycarbonates derived from divalent aromatic alcohols such as 2,2-bis(4-hydroxyphenyl)propane (bisphenol A), bis(4-hydroxyphenyl)methane, 1,1-bis(4-hydroxyphenyl)ethane, 1,1-bis(4-hydroxyphenyl)cyclohexane, 2,2-bis(4-hydroxy-3,5-dimethylphenyl)propane, 2,2-bis(4-hydroxy-3,5-dibromophenyl)propane, 2,2-bis(hydroxy-3-methylphenyl)propane, bis(4-hydroxyphenyl) sulfide, bis(4-hydroxyphenyl) sulfone, hydroquinone, resorcinol, 4,6-dimethyl-2,4,6-tri(4-hydroxyphenyl)heptene, 2,6-dimethyl-2,4,6-tri(4-hydroxyphenyl)heptene, 1,3,5-tri(4-hydroxyphenyl)benzene, 1,1,1-tri(4-hydroxyphenyl)ethane, 3,3-bis(4-hydroxyaryl)oxyindole, 5-chloro-3,3-bis(4-hydroxyaryl)oxyindole, 5,7-dichloro-3,3-bis(4-hydroxyaryl)oxyindole and 5-boromo-3,3-bis(4-hydroxyaryl)oxyindole, and their derivatives. Among them, especially preferably used is a cyclic polycarbonate derived from 2,2-bis(4-hydroxyphenyl)propane (bisphenol A). These cyclic polycarbonates may be produced by, for example, a method described in Macromolecules, vol. 24, pages 3035-3044 (1991).

The cyclic polysulfone preferably used according to the embodiment of the invention is not specifically limited but may be any cyclic compound having a sulfonyl bond as the ring-forming bond. Preferable are cyclic polysulfones having a diphenyl sulfone structure as the structure unit. Especially preferable are cyclic polysulfone compounds having diphenyl sulfone structures linked by ether bonding and cyclic polysulfone compounds having diphenyl sulfone structures and divalent aromatic dioxy structures linked alternately. The divalent aromatic dioxy structure herein may be any of structures derived from hydroquinone, catechol, resorcinol, 4,4'-biphenol, 2,2-bis(4-hydroxyphenyl) alkanes, such as 2,2-bis(4-hydroxyphenyl)propane, 2,2-bis (4-hydroxyphenyl)methane and 2,2-bis(4-hydroxyphenyl) ethane, dihydroxyphenyl ethers such as 4,4'-dihydroxydiphenyl ether, and their structural isomers. Especially preferable are the structures derived from hydroquinone, 4,4'-biphenol, 2,2-bis(4-hydroxyphenyl)-propane (bisphenol A), bis(4-hydroxyphenyl)methane (bisphenol F), 4,4'-ethylidenebisphenol (bisphenol E) and 4,4'-dihydroxydiphenyl ether. Most preferable is the structure derived from 2,2-bis(4-hydroxyphenyl)propane (bisphenol A). These cyclic polysulfone compounds may be produced by, for example, a method disclosed in JP H03-088828A.

The cyclic poly(phenylene ether ether ketone) preferably used according to the embodiment of the invention is a cyclic compound expressed by General Formula (vi) having para-phenylene ketone and para-phenylene ether as the repeating structural units.

[Chem. 8]

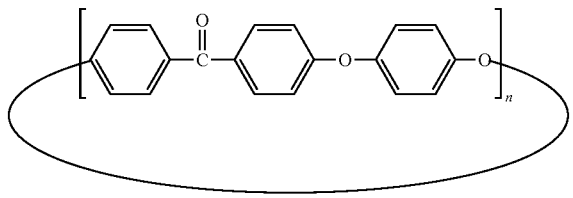

(vi)

A number of repetitions n in the above General Formula (vi) is preferably not less than 2. The number of repetitions n is also preferably not greater than 40, is more preferably not greater than 20 and is furthermore preferably not greater than 15. As described later, it is preferable to perform conversion of a cyclic poly(phenylene ether ether ketone) composition into a poly(phenylene ether ether ketone) component block at a temperature equal to or higher than a melting temperature of the cyclic poly(phenylene ether ether ketone) composition. An increase in number of repetitions n is likely to increase the melting temperature of the cyclic poly(phenylene ether ether ketone) composition. It is thus preferable to set the number of repetitions n to the above range, in terms of melting the cyclic poly(phenylene ether ether ketone) at low temperature and allowing for conversion into the poly(phenylene ether ether ketone) component block at the lower temperature.

The cyclic poly(phenylene ether ether ketone) expressed by the above General Formula (vi) may be either a single compound having a single number of repetitions or a mixture of cyclic compounds having different numbers of repetitions. The mixture of the cyclic compounds having the different numbers of repetitions is, however, likely to have a lower melting temperature than the single compound having the single number of repetitions. It is thus preferable to use the mixture of the cyclic compounds having the different numbers of repetitions, in terms of decreasing the temperature of conversion into the poly(phenylene ether ether ketone) component block to the lower temperature. The cyclic poly(phenylene ether ether ketone)s having different numbers of repetitions n may be analyzed by component analysis by high-performance liquid chromatography. The composition of the cyclic poly(phenylene ether ether ketone)s or more specifically weight fractions of the respective cyclic poly(phenylene ether ether ketone)s having different numbers of repetitions n included in the cyclic poly(phenylene ether ether ketone)s may be calculated from peak area ratios of the respective cyclic poly(phenylene ether ether ketones) in high-performance liquid chromatography.

A primary component other than the cyclic poly(phenylene ether ether ketone) included in the cyclic poly (phenylene ether ether ketone) composition according to the embodiment of the invention may be a linear poly(phenylene ether ether ketone). The cyclic poly(phenylene ether ether ketone) composition is a composition including 60% by weight or higher of the cyclic poly(phenylene ether ether ketone), preferably 65% by weight or higher, more preferably 70% by weight or higher or furthermore preferably 75% by weight or higher of the cyclic poly(phenylene ether ether ketone). Using this cyclic poly(phenylene ether ether ketone) composition facilitates production of the poly(phenylene ether ether ketone) component block in a shorter processing time. The weight fractions of the cyclic poly (phenylene ether ether ketone)s included in the cyclic poly (phenylene ether ether ketone) composition may be calculated from peak area ratios of the respective cyclic poly (phenylene ether ether ketones) in high-performance liquid chromatography.

These cyclic poly(phenylene ether ether ketone)s may be produced by, for example, a technique disclosed in WO 2011/081080.

<Molecular Weight of Copolymer>

The copolymer described in the embodiment of the invention has a maximum peak molecular weight measured by size exclusion chromatography (SEC) of preferably not less than 2,000, more preferably not less than 3,000 or especially preferably not less than 5,000. The maximum peak molecular weight is also preferably less than 2,000,000, is more preferably less than 1,000,000 and is especially preferably less than 500,000. Furthermore, the maximum peak molecular weight is preferably in the above range and has a unimodal molecular weight distribution in the above range. The maximum peak molecular weight in the above range provides favorable physical properties and good molding processability of the resulting copolymer. The maximum peak molecular weight herein denotes a molecular weight corresponding to a maximum value of a chromatogram obtained by measurement by an SEC apparatus equipped with a differential refractive index detector. In a chromatogram with the retention time as abscissa and the substrate concentration as ordinate, the maximum peak molecular weight may be calculated by specifying a retention time providing a maximum value of the substrate concentration and substituting the specified retention time into a relational expression of the molecular weight to the retention time obtained by measurement of a standard substance having a known absolute molecular weight (polystyrene is used in the embodiment). According to this embodiment, the measurement conditions of SEC include using 1-chloronaphthalene as an eluent and dissolving the copolymer in the eluent at a concentration of 0.05% by weight. The measurement temperature of SEC may be in the range of 50 to 250° C. and may be changed in each stage of the SEC apparatus such as a column or a detector. This embodiment employs a column temperature of 210° C., a pre-thermostat temperature of 250° C., a pump thermostat temperature of 50° C. and a detector temperature of 210° C.

Like the maximum peak molecular weight, the molecular weight distribution or more specifically the division of the weight-average molecular weight by the number-average molecular weight may be measured by SEC. The value of the molecular weight distribution is preferably not less than 1.1. The value of the molecular weight distribution is also preferably not greater than 10.0, is more preferably not greater than 8.0 and is especially preferably not greater than 5.0. It is preferable that the copolymer according to the embodiment of the invention has a unimodal molecular weight distribution in a molecular weight range of not less than 2,000 and less than 2,000,000. The unimodal herein means that the chromatogram obtained by the above SEC measurement has a single positive maximum value. The chromatogram may have another local maximum value in a residual range other than the molecular weight range of not less than 2,000 and less than 2,000,000. It is confirmed that such a molecular weight distribution allows for production of a block copolymer that includes an extremely small amount of a homopolymer and has a uniform composition distribution.

The molecular weight of the copolymer according to the embodiment of the invention is not less than 2,000, is preferably not less than 4,000 and is more preferably not less than 5,000 as the number-average molecular weight. The upper limit of the number-average molecular weight is not specifically restricted, but is preferably in a range of less than 2,000,000, more preferably less than 500,000 and furthermore preferably less than 200,000. The number-average molecular weight in this preferable range is advantageous since it is likely to provide the high mechanical properties and the high chemical resistance and ensure the good molding processability.

<Production Method of Copolymer>

The copolymer according to the embodiment of the invention may be produced by either a method of concurrently synthesizing at least two polymer component blocks comprised of the copolymer to produce the copolymer or a successive production method of synthesizing at least one polymer component block and using the synthesized polymer component block as a raw material or an initiator. In terms of reducing contamination of the homopolymer in the copolymer, the successive production method is preferably employed. The following describes the production method of the copolymer according to the embodiment of the invention.

The polymer component block comprised of the copolymer according to the embodiment of the invention is produced by ring-opening polymerization of a cyclic compound. The ring-opening polymerization may be performed in the presence of at least an initiator. The initiator is not specifically limited but may be any compound that initiates the ring-opening polymerization reaction. For example, the initiator used may be any known initiator such as a photopolymerization initiator, a radial polymerization initiator, a cationic polymerization initiator, an anionic polymerization initiator or a transition metal catalyst. Among them, the anionic polymerization initiator is preferable. The initiator herein includes polymer compounds having reactive terminal groups that initiate the ring-opening polymerization. The anionic polymerization initiator generally has nucleophilicity, and an active species promotes polymerization of an anion with nucleophilic addition of the initiator to a monomer as the initiation reaction. In anionic ring-opening polymerization of a cyclic compound according to the embodiment of the invention, in one case, nucleophilic addition of the anionic polymerization initiator causes ring-opening of the cyclic compound to produce a polymer having an anionic terminal group, and the anionic ring-opening polymerization is promoted by the further ring-opening reaction of the cyclic compound accelerated by the produced anion. In another case, the anionic ring-opening polymerization is promoted by nucleophilic addition of an anion produced on the cyclic compound or the monomer to the terminal of a polymer. The anionic polymerization initiator is not specifically limited but may be any compound that generates an anionic species. Examples of the anionic polymerization initiator include inorganic metal salts such as inorganic alkali metal salts and inorganic alkaline earth metal salts and organic metal salts such as organic alkali metal salts and organic alkaline earth metal salts. Examples of the inorganic alkali metal salt and inorganic alkaline earth metal salt include alkali metal halides such as sodium fluoride, potassium fluoride, cesium fluoride and lithium chloride; alkali metal hydrides such as lithium hydride, sodium hydride and potassium hydride; alkali metal and alkaline earth metal hydroxides such as lithium hydroxide, sodium hydroxide, potassium hydroxide, cesium hydroxide, magnesium hydroxide, calcium hydroxide and barium hydroxide; alkali metal sulfides such as lithium sulfide, sodium sulfide and potassium sulfide; alkali metal hydrosulfides such as lithium hydrosulfide, sodium hydrosulfide and potassium hydrosulfide; and alkali metal carbonates such as lithium carbonate, sodium carbonate and potassium carbonate. Among them, the alkali metal halides and alkali metal sulfides are preferably used.

Ionic compounds expressed by Formula (vii) are preferable as the organic alkali metal salts and the organic alkaline earth metal salts:

[Chem. 9]

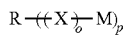

(vii)

(where o represents an integral number of 0 to 1, and p represents an integral number of 1 to 4.)

In Formula (vii), preferable examples of R include 1 to 20 carbon atom-containing alkyl groups such as methyl, propyl, n-butyl, isobutyl, s-butyl and t-butyl and their derivatives; aryl groups such as phenyl, naphthyl, 4-phenylphenyl, 3-phenylphenyl, 2-phenylphenyl, 4-phenoxyphenyl, 3-phenoxyphenyl, 2-phenoxyphenyl, 4-benzophenyl, 3-benzophenyl, 2-benzophenyl, anthryl and fluorenyl and their derivatives; and polymer chains such as polyphenylene sulfide, polyamide, polyester, polycarbonate and polysulfone. Among them, the aryl groups and their derivatives and the polymer chains are preferable. X may be, for example, an oxygen atom, a sulfur atom, a carboxyl group, an amide group or a carbonate group or may be a functional group as any combination thereof. Preferable examples of M are monohalides of alkali metals such as lithium, sodium, potassium and cesium and alkaline earth metals such as magnesium and calcium.

Examples of the ionic compound described above include metal alkoxides including alkali metal salts of 1 to 20 carbon atom-containing aliphatic alcohols such as sodium methoxide, potassium methoxide, lithium methoxide, cesium methoxide, sodium ethoxide, potassium ethoxide, lithium ethoxide, cesium ethoxide, sodium n-butoxide, potassium n-butoxide, lithium n-butoxide, cesium n-butoxide, sodium s-butoxide, potassium s-butoxide, lithium s-butoxide, cesium s-butoxide, sodium t-butoxide, potassium t-butoxide, lithium t-butoxide, cesium t-butoxide, sodium n-propoxide, potassium n-propoxide, lithium n-propoxide, cesium n-propoxide, sodium isopropoxide, potassium isopropoxide, lithium isopropoxide, cesium isopropoxide, sodium cyclohexanolate, potassium cyclohexanolate, lithium cyclohexanolate and cesium cyclohexanolate; metal phenoxides including alkali metal salts of phenols such as sodium phenoxide, potassium phenoxide, lithium phenoxide, cesium phenoxide, sodium 4-phenylphenoxide, potassium 4-phenylphenoxide, lithium 4-phenylphenoxide, cesium 4-phenylphenoxide, sodium 4-phenoxyphenoxide, potassium 4-phenoxyphenoxide, lithium 4-phenoxyphenoxide, cesium 4-phenoxyphenoxide, sodium 4-benzoylphenoxide, potassium 4-benzoylphenoxide, lithium 4-benzoylphenoxide, cesium 4-benzoylphenoxide, sodium 2-benzylphenoxide, potassium 2-benzylphenoxide, lithium 2-benzylphenoxide, sodium 4-benzylphenoxide, potassium 4-benzylphenoxide and lithium 4-benzylphenoxide, and alkali metal salts of biphenols such as sodium salt of 4,4'-dihydroxybiphenyl, potassium salt of 4,4'-dihydroxybiphenyl, lithium salt of 4,4'-dihydroxybiphenyl, cesium salt of 4,4'-dihydroxybiphenyl, sodium salt of bisphenol A, potassium salt of bisphenol A, lithium salt of bisphenol A and cesium salt of bisphenol A; and alkali metal salts of thiols such as sodium benzenethiolate, potassium benzenethiolate, lithium benzenethiolate, cesium benzenethiolate, sodium 4-phenylbenzenethiolate, potassium 4-phenylbenzenethiolate, lithium 4-phenylbenzenethiolate, cesium 4-phenylbenzenethiolate, sodium 4-phenoxybenzenethiolate, potassium 4-phenoxybenzenethiolate, lithium 4-phenoxybenzenethiolate, cesium 4-phenoxybenzenethiolate, sodium 4-benzoylbenzenethiolate, potassium 4-benzoylbenzenethiolate, lithium 4-benzoylbenzenethiolate, cesium 4-benzoylbenzenethiolate, sodium 2-benzylbenzenethiolate, potassium 2-benzylbenzenethiolate, lithium 2-benzylbenzenethiolate, sodium 4-benzylbenzenethiolate, potassium 4-benzylbenzenethiolate, lithium 4-benzylbenzenethiolate, sodium salt of 4,4'-biphenyldithiol, potassium salt of 4,4'-biphenyldithiol, lithium salt of 4,4'-biphenyldithiol and cesium salt of 4,4'-biphenyldithiol.

The initiator used according to the embodiment of the invention may be a single initiator or may be a combination of two or more different initiators. The amount of the initiator used is varied according to the molecular weight of a target polymer component block and according to the type of a catalyst when the catalyst is used along with the initiator. The amount of the initiator is generally not lower than 0.001 mol %, is preferably not lower than 0.005 mol % and is furthermore preferably not lower than 0.01 mol % as the anion concentration producible by the initiator relative to 1 mol of the primary repeating unit comprised of the target polymer component block. The amount of the initiator is also generally not higher than 20 mol %, is preferably not higher than 15 mol % and is furthermore preferably not higher than 10 mol % as the anion concentration. Addition of the amount of the initiator in this preferable range makes the ring-opening polymerization likely to proceed in a short time period.

Examples of the catalyst that accelerates the ring-opening reaction include tin compounds such as tin (II) chloride, tin (II) bromide, tin (II) iodide, tin (II) sulfate, tin(IV) oxide, tin myristate, tin octylate, tin 2-ethylhexylate, tin stearate, tetraphenyltin, tin methoxide, tin ethoxide, tin propoxide, tin butoxide and 1,3-dichloro-1,1,3,3-tetrabutyldistannoxane; aluminum compounds such as aluminum, aluminum oxide, aluminum acetylacetonate, aluminum isopropoxide and aluminum-imine complex titanium tetrachloride; titanium compounds such as titanium, tetramethyl orthotitanate, tetraethyl orthotitanate, tetrapropyl orthotitanate, tetraisopropyl orthotitanate, tetra-n-butyl orthotitanate, tetraisobutyl orthotitanate, tetra-t-butyl orthotitanate, tetra(2-ethylhexyl) orthotitanate, tetraoctadecyl orthotitanate, titanium (IV) oxyacetylacetonate, titanium (IV) diisopropoxybisacetylacetonate and glycol titanate; zinc compounds such as zinc, zinc chloride, zinc oxide, zinc acetate and diethylzinc; antimony compounds such as antimony, antimony trioxide, antimony tribromide and antimony acetate; germanium compounds such as germanium and germanium oxide; manganese compounds such as manganese, manganese oxide, manganese carbonate and manganese acetate; and combinations of two or more of these compounds.

The copolymer according to the embodiment of the invention is preferably produced by ring-opening polymerization of a cyclic compound having a different structure from the repeating structural unit of the polymer component block that has the reactive terminal group of initiating the anionic, the cationic or any other ring-opening polymerization and is produced as described above, in the presence of this polymer component block.

The production method of the copolymer according to the embodiment of the invention preferably includes the following steps (a) and (b):

(a) step of ring-opening polymerization of the cyclic polyphenylene sulfide expressed by General Formula (v) given above in the presence of the initiator; and (b) step of ring-opening polymerization of one cyclic compound selected from the group consisting of the cyclic amide, the cyclic ester, the cyclic polycarbonate, the cyclic polysulfone and the cyclic poly(phenylene ether ether ketone) in the presence of the initiator.

The step (a) and the step (b) may be independent steps from each other. Alternatively, a polymer component block produced in one of the steps (a) and (b) may be used as the initiator of the other step. In order to produce a homogeneous copolymer without contamination of a homopolymer, the production method preferably uses a polymer component block produced in one of the steps (a) and (b) as the initiator of the other step.

In the above step (a), the heating temperature in ring-opening polymerization of the cyclic polyphenylene sulfide is not specifically limited but is preferably the temperature of melting the cyclic polyphenylene sulfide. When the heating temperature is lower than the melting temperature of the cyclic polyphenylene sulfide, it is likely to require a long time to obtain a polyphenylene sulfide component block. The temperature of melting the cyclic polyphenylene sulfide is varied according to the composition and the molecular weight of the cyclic polyphenylene sulfide and the environment during heating and is not unequivocally specifiable. The melting temperature may, however, be determined by analysis of the cyclic polyphenylene sulfide with a differential scanning calorimeter. The lower limit of the heating temperature is, for example, not lower than 180° C., is preferably not lower than 200° C., is more preferably not lower than 220° C. and is furthermore preferably not lower than 240° C. In this temperature range, the cyclic polyphenylene sulfide is melted to produce the polyphenylene sulfide component block in a short time period. The excessively high temperature is, on the other hand, likely to cause undesired side reactions such as degradation reaction and crosslinking reaction between the cyclic polyphenylene sulfides, between the cyclic polyphenylene sulfide component blocks produced by heating and between the cyclic polyphenylene sulfide and the cyclic polyphenylene sulfide component block. This may result in deteriorating the properties of a resulting polyphenylene sulfide component block and a resulting copolymer, so that it is desirable to avoid the temperature that significantly causes such undesired side reactions. The upper limit of the heating temperature is, for example, not higher than 400° C., is preferably not higher than 380° C. and is more preferably not higher than 360° C. Such or lower temperature is likely to suppress the adverse effects of the undesired side reactions on the properties of the resulting polyphenylene sulfide component block and the resulting copolymer and allows for production of the polyphenylene sulfide component block having the properties described above.

In the above step (a), the reaction time (heating time) of ring-opening polymerization of the cyclic polyphenylene sulfide is varied according to various properties such as the content ratio, the number of repetitions (m) and the molecular weight of the cyclic compound included in the cyclic polyphenylene sulfide used, the types of the polymerization initiator and the the catalyst used and the conditions such as heating temperature and is not unequivocally specifiable. It is, however, preferable to set the heating time such as to minimize the undesired side reactions described above. The heating time is, for example, not shorter than 0.01 hours and is preferably not shorter than 0.05 hours. The heating time of not shorter than 0.01 hours is likely to sufficiently convert the cyclic polyphenylene sulfide into the polyphenylene sulfide component block. The heating time is also, for example, not longer than 100 hours, is preferably not longer than 20 hours and is more preferably not longer than 10 hours. Moreover, the heating time may be not longer than 2 hours, not longer than 1 hour, not longer than 0.5 hours, not longer than 0.3 hours and even not longer than 0.2 hours. The heating time of not longer than 100 hours is likely to suppress the adverse effects of the undesired side reactions on the properties of the obtained polyphenylene sulfide component block.

In the above step (a), heating of the cyclic polyphenylene sulfide may be performed in a substantially solvent-free condition. This condition allows for a temperature rise in a short time period, provides the high reaction rate and is thus likely to produce the polyphenylene sulfide component block in a short time period. The substantially solvent-free condition herein means that the content of the solvent in the cyclic polyphenylene sulfide is not higher than 10% by weight and is preferably not higher than 3% by weight.

Let alone using a conventional polymerization reactor for the heating, the above step (a) may use a mold for producing a molded product or may use an extruder or a melt kneader for such heating. Any apparatus equipped with a heating mechanism may be used for the heating, and a conventional system such as a batch system or a continuous system may be employed for such heating.

The atmosphere in the course of heating the cyclic polyphenylene sulfide is preferably a non-oxidizing atmosphere and is also preferably under a reduced pressure condition. When heating is performed under the reduced pressure condition, a preferable procedure may control the atmosphere in the reaction system first to the non-oxidizing atmosphere and then to the reduced pressure condition. This is likely to suppress undesired side reactions such as degradation reaction and crosslinking reaction between the cyclic polyphenylene sulfides, between the cyclic polyphenylene sulfide component blocks produced by heating and between the cyclic polyphenylene sulfide and the cyclic polyphenylene sulfide component block. The non-oxidizing atmosphere denotes an atmosphere having an oxygen concentration of not higher than 5% by volume in the gas phase which the cyclic polyphenylene sulfide is exposed to, is preferably an atmosphere having the oxygen concentration of not higher than 2% by volume and is more preferably an atmosphere that does not substantially contain oxygen or more specifically an inert gas atmosphere such as nitrogen, helium or argon. Among them, nitrogen atmosphere is preferable, in terms of its economic efficiency and easiness of handling. The reduced pressure condition denotes that the pressure in the reaction system is lower than the atmospheric pressure. The upper limit of the pressure in the system is preferably not higher than 50 kPa, is more preferably not higher than 20 kPa and is furthermore preferably not higher than 10 kPa. The lower limit is, for example, not lower than 0.1 kPa and is more preferably not lower than 0.2 kPa. The pressure of the reduced pressure condition of not lower than the preferable lower limit is unlikely to cause vaporization of low molecular-weight cyclic compounds including the cyclic polyphenylene sulfide. The reduced pressure condition of not higher than the preferable upper limit is, on the other hand, unlikely to cause the undesired side reactions such as crosslinking reaction. Employing the preferable reduced pressure condition described above accordingly facilitates production of the polyphenylene sulfide component block having the properties described above.

In the above step (b), the heating temperature in ring-opening polymerization of a cyclic amide compound is not specifically limited but may be any temperature of homogeneously melting the cyclic amide compound as the raw material and a polyamide component block or a copolymer obtained as the result of the ring-opening polymerization. When the heating temperature is not lower than the homogenization temperature of the cyclic amide compound and the polyamide component block or the copolymer, it is likely to produce a high polymerization degree of polyamide component block in a short time period. Accordingly the heating temperature is preferably not lower than 100° C. and is more preferably not lower than 120° C. The homogenization temperature is varied according to the structure and the molecular weight of the cyclic amide compound and the environment during heating and is thus not unequivocally specifiable. For example, the homogenization temperature may be determined by, for example, sealing a cyclic amide compound and a polymerization initiator in a test tube in a nitrogen atmosphere and observing the test tube during heating. The excessively high heating temperature is likely to cause undesired side reactions such as degradation of the cyclic amide compound in the composition and crosslinking-induced gelation. This may result in a failure in producing a polyamide component block or a copolymer or may deteriorate the properties of the resulting polyamide component block. Accordingly, the heating temperature is preferably not higher than 380° C., is more preferably not higher than 360° C. and is furthermore preferably not higher than 340° C. The reaction may be performed at a fixed temperature or may be performed at the temperature varying stepwise or continuously. Additionally, it is preferable to use the resulting polyamide component block for the above step (a), since this is more likely to suppress vaporization of the cyclic amide compound during the reaction and ensures the sufficient reaction.

In the above step (b), the temperature in ring-opening polymerization of a cyclic ester compound or a cyclic carbonate compound is not specifically limited but may be any temperature of homogeneously melting the cyclic compound as the raw material and a polymer component block or a copolymer obtained as the result of ring-opening polymerization. The temperature of melting the cyclic carbonate compound is varied according to the type and the molecular weight of the cyclic compound and the environment during heating and is thus not unequivocally specifiable. The melting temperature may be determined by, for example, analysis of the cyclic compound with a differential scanning calorimeter. The lower limit of the heating temperature is for example, not lower than 80° C., is preferably not lower than 100° C., is more preferably not lower than 120° C. and is furthermore preferably not lower than 150° C. Such or higher temperature facilitates ring-opening polymerization and is more likely to obtain a polymer of a high conversion rate and a high molecular weight. The upper limit of the heating temperature is, for example, not higher than 400° C., is preferably not higher than 380° C., is more preferably not higher than 360° C. and is furthermore preferably not higher than 340° C. Such or lower temperature is likely to suppress undesired side reactions such as depolymerization by the back-biting reaction and gelation. Additionally, it is preferable to use the resulting polyester component block or the resulting polycarbonate component block for the above step (a), since this is likely to produce a homogeneous copolymer.

In the above step (b), the temperature in ring-opening polymerization of a cyclic sulfone compound is varied according to the type and the molecular weight of the cyclic compound and the environment during heating and is thus not unequivocally specifiable. For example, the temperature may be determined by, for example, observing a melting or softening behavior with a melting point microscope or an optical microscope with a hot stage. The lower limit of the heating temperature is for example, not lower than 80° C., is preferably not lower than 100° C., is more preferably not lower than 120° C. and is furthermore preferably not lower than 150° C. Such or higher temperature facilitates ring-opening polymerization and is more likely to obtain a polymer of a high conversion rate and a high molecular weight. The upper limit of the heating temperature is, for example, not higher than 400° C., is preferably not higher than 380° C., is more preferably not higher than 360° C. and is furthermore preferably not higher than 340° C. Additionally, it is preferable to use the resulting polysulfone component block for the above step (a), since this is likely to produce a homogeneous copolymer.

In the above step (b), the temperature in ring-opening polymerization of a cyclic poly(phenylene ether ether ketone) is varied according to the type and the molecular weight of the cyclic compound and the environment during heating and is thus not unequivocally specifiable. The melting point may be determined by, for example, analysis of the above cyclic compound with a differential scanning calorimeter. The lower limit of the heating temperature is, for example, not lower than 180° C., is preferably not lower than 200° C., is more preferably not lower than 220° C. and is furthermore preferably not lower than 240° C. In this temperature range, the above cyclic compound is melted to produce a copolymer in a short time period. The excessively high temperature is, on the other hand, likely to cause undesired side reactions such as degradation reaction and crosslinking reaction between, for example, the raw material and the resulting product. This may result in deteriorating the properties of a resulting copolymer, so that it is desirable to avoid the temperature that significantly causes such undesired side reactions. The upper limit of the heating temperature is, for example, not higher than 400° C. and is preferably not higher than 360° C. Such or lower temperature is likely to suppress the adverse effects of the undesired side reactions on the properties of the resulting copolymer and allows for production of the copolymer having the properties described above. Additionally, in the case of production of a polyphenylene sulfide/poly(phenylene ether ether ketone) block copolymer according to the embodiment of the invention, it is preferable to use the product obtained in the above step (a) for the above step (b), since this is likely to produce a homogeneous copolymer.

In the above step (b), the reaction time is varied according to various properties such as the type and the molecular weight of the cyclic compound used, the types of the polymerization initiator and the catalyst used and the conditions such as the heating temperature and is not unequivocally specifiable. It is, however, preferable to set the reaction time such as to minimize the undesired side reactions. The heating time is, for example, not shorter than 0.01 hours and is preferably not shorter than 0.05 hours. The heating time is also, for example, not longer than 100 hours, is preferably not longer than 20 hours and is more preferably not longer than 10 hours.

In the above step (b), ring-opening polymerization of the cyclic compound may be performed in a substantially solvent-free condition. This condition allows for a temperature rise in a short time period, provides the high reaction rate and is thus likely to produce the polymer component block in a short time period. The substantially solvent-free condition herein means that the content of the solvent in the cyclic compound is not higher than 10% by weight and is preferably not higher than 3% by weight.

Let alone using a conventional polymerization reactor for the heating, the above step (b) may use a mold for producing a molded product or may use an extruder or a melt kneader for such heating. Any apparatus equipped with a heating mechanism may be used for the heating, and a conventional system such as a batch system or a continuous system may be employed for such heating.

In the above step (b), the atmosphere in the course of heating the cyclic compound is preferably a non-oxidizing atmosphere and is also preferably under a reduced pressure condition. When heating is performed under the reduced pressure condition, a preferable procedure may control the atmosphere in the reaction system first to the non-oxidizing atmosphere and then to the reduced pressure condition. This is likely to suppress undesired side reactions such as crosslinking reaction and degradation reaction. The non-oxidizing atmosphere denotes an atmosphere having an oxygen concentration of not higher than 5% by volume in the gas phase which the cyclic compound is exposed to, is preferably an atmosphere having the oxygen concentration of not higher than 2% by volume and is more preferably an atmosphere that does not substantially contain oxygen or more specifically an inert gas atmosphere such as nitrogen, helium or argon. Among them, nitrogen atmosphere is preferable, in terms of its economic efficiency and easiness of handling. The reduced pressure condition denotes that the pressure in the reaction system is lower than the atmospheric pressure. The upper limit of the pressure in the system is preferably not higher than 50 kPa, is more preferably not higher than 20 kPa and is furthermore preferably not higher than 10 kPa. The lower limit is, for example, not lower than 0.1 kPa and is more preferably not lower than 0.2 kPa.

Heating the cyclic compound in the step (a) and/or in the step (b) may be performed in the coexistence of a fibrous material. The fibrous material herein means a slender thread-like material and is preferably any material of elongated structure, such as natural fibers. Conversion of a cyclic compound into a copolymer or a polymer component block in the presence of the fibrous material facilitates production of a composite material structure of the resulting polymer and the fibrous material. This structure is reinforced by the fibrous material and is thus likely to have, for example, the better mechanical properties, compared with the polymer alone.

Among a variety of fibrous materials, it is preferable to use a long-fibrous reinforced fiber. This enables the polymer to be highly reinforced. In general, in the case of production of a composite material structure of a resin and a fibrous material, the high melt viscosity of the resin is likely to reduce the wettability between the resin and the fibrous material, which may result in a failure in producing a homogeneous composite material or a failure in providing expected mechanical properties. The wettability herein means a contact between a fluid material like a molten resin and a solid substrate such as a fibrous compound provided and kept in the good physical state without causing substantially no air or another gas to be trapped between the fluid material and the solid substrate. The lower viscosity of the fluid material is likely to provide the better wettability with the fibrous material. The cyclic compound according to the embodiment of the invention has the significantly low melt viscosity, compared with general thermoplastic resins and is thus likely to have the good wettability with the fibrous material. After achieving the good wettability between the cyclic compound and the fibrous material, the production method of a copolymer according to the embodiment of the invention converts the cyclic compound into a polymer. This facilitates production of the composite material structure in which the fibrous material and the copolymer have the good wettability.

The fibrous material is preferably the long-fibrous reinforced fiber as described above. The reinforced fiber used according to the embodiment of the invention is not specifically limited, but the reinforced fiber favorably used may be a fiber of high heat resistance and high tensile strength generally used as high-performance reinforced fiber. Examples of such reinforced fiber include glass fibers, carbon fibers, graphite fibers, aramid fibers, silicon carbide fibers, alumina fibers and boron fibers. Among them, most preferable are carbon fibers and graphite fibers which have high specific strength and high specific modulus and are expected to significantly contribute to weight reduction. The carbon fiber and the graphite fiber used may be any types of carbon fibers and graphite fibers according to their applications, but most suitable is a high-strength, high-elongation carbon fiber having the tensile strength of 450 kgf/mm and the tensile elongation of not less than 1.6%. In the case of using the long-fibrous reinforced fiber, the fiber length is preferably 5 cm or longer. This range of the fiber length facilitates the strength of the reinforced fiber to be sufficiently provided in the composite material. The carbon fiber or the graphite fiber used may be mixed with another reinforced fiber. There is no limitation in shape or arrangement of the reinforced fiber. For example, the arrangement of the reinforced fiber used may be a unidirectional arrangement, a random directional arrangement, a sheet-like arrangement, a mat-like arrangement, a fabric-like arrangement or a braid-like arrangement. In applications that need high specific strength and high specific modulus, the reinforced fiber in the unidirectional arrangement is most suitable. The easily-handled reinforced fiber in the cloth (fabric)-like arrangement is also suitable for the embodiment of the invention.

The conversion of the cyclic compound into the copolymer or the polymer component block described above may be performed in the presence of a filler. The filler used may be, for example, non-fibrous glass, non-fibrous carbon or an inorganic filler such as calcium carbonate, titanium oxide or alumina.

The copolymer containing the polyarylene sulfide component block according to the embodiment of the invention has high heat resistance and solvent resistance of polyarylene sulfide and excellent physical properties derived from the homogeneous micro-separated structure by blocking and may thus be used in a variety of applications including automobile parts, electric and electronic parts, architectural components, various vessels and containers, daily necessities, household goods and sanitary articles and is applicable to fibers, films and sheets.

EXAMPLES

The invention is described more specifically with reference to examples. These examples are, however, only illustrative and not restrictive.
[Measurement of Molecular Weights]

The average molecular weights and the maximum peak molecular weights of the cyclic polyphenylene sulfide, the cyclic polyphenylene sulfide component block and the other component blocks and the copolymers were measured by size exclusion chromatography (SEC) and were determined as values of polystyrene equivalent. The measurement conditions are given below:
  Apparatus: SSC-7100 manufactured by Senshu Scientific Co., Ltd.
  Column: GPC3506 manufactured by Senshu Scientific Co., Ltd.
  Eluent: 1-chloronaphthalene
  Detector: differential refractive index detector
  Column temperature: 210° C.
  Pre-thermostat temperature: 250° C.
  Pump thermostat temperature: 50° C.
  Detector temperature: 210° C.
  Flow rate: 1.0 mL/min
  Sample injection volume: 300 µL
  When the copolymer includes the poly(phenylene ether ether ketone) component block, p-chlorophenol/1-chloronaphthalene=1/1 (volume ratio) was used as the eluent.

With regard the molecular weight distribution profile, a chromatogram by the above SEC measurement having one positive maximum value in the molecular weight range of 2,000 to 2,000,000 was evaluated as unimodal and a chromatogram having a plurality of positive maximum values was evaluated as multimodal.
[Evaluation of Melt Homogeneity]

A polymer was placed between cover glasses and was stood still on a heating stage TH-600PM for microscope manufactured by Linkam Scientific Instruments Ltd. The polymer was heated from 25° C. to 300° C. at a temperature rise rate of 90° C./minute, and the phase separation after retention for 5 minutes was observed with a phase contrast microscope OPTIPHOT XF-Ph (magnification: 50-fold) manufactured by Nikon Instruments Inc. The melt homogeneity was evaluated under the following criteria:
  Homogeneous: homogeneous single phase state having the phase separation size of not greater than 1 µm
  Heterogeneous: Coarse phase separation state of several to several ten µm
[Calculation of Consumption Rate of Cyclic Polyphenylene Sulfide or Cyclic Poly(Phenylene Ether Ether Ketone) in Copolymer and Content of Cyclic Poly(Phenylene Ether Ether Ketone) Contained in Cyclic Poly(Phenylene Ether Ether Ketone) Composition]

The weight fraction of cyclic polyphenylene sulfide or cyclic poly(phenylene ether ether ketone) in a copolymer and the content of cyclic poly(phenylene ether ether ketone) contained in a cyclic poly(phenylene ether ether ketone) composition were measured and determined as follows. The copolymer or the composition was dissolved in a mixed solvent p-chlorophenol/1-chloronaphthalen=6/4 (v/v) with heating at 220° C., was diluted with tetrahydrofuran (THF), was filtrated through a membrane filter having the pore size of 0.45 μm and was measured by high-performance liquid chromatography under the following conditions.

Apparatus: LC-10Avp Series manufactured by Shimadzu Corporation
Column: Mightysil RP-18 GP150-4.6
Detector: photodiode array detector (using UV=270 nm)
Column temperature: 40° C.
Sample concentration: 0.02 wt % tetrahydrofuran (THF) solution
Mobile phase: THF/0.1 wt % trifluoroacetic acid aqueous solution The consumption rate of cyclic polyphenylene sulfide or cyclic poly(phenylene ether ether ketone) in the copolymer was calculated by an equation given below:

(consumption rate of cyclic polyphenylene sulfide or cyclic poly(phenylene ether ether ketone) in copolymer) (%)=100−(weight fraction of cyclic polyphenylene sulfide or cyclic poly(phenylene ether ether ketone) in copolymer) (%)

[Measurement of Melting Point and Melt Crystallization Temperature]

The thermal characteristic of a resulting polymer was measured in a nitrogen atmosphere using a robot DSC RDC220 manufactured by Seiko Instruments Inc. as the differential scanning calorimeter. The measurement conditions given below were employed. The value of an endothermic peak in Second Run was used as the melting point, and the value of an exothermic peak in First Run was used as the melt crystallization temperature:

(First Run)
    holding at 50° C.×1 minute
    raising temperature from 50° C. to 380° C. at temperature rise rate of 20° C./minute
    holding after temperature rise×1 minute
    decreasing temperature to 50° C. at temperature decrease rate of 20° C./minute
(Second Run)
    holding at 50° C.×1 minute
    raising temperature from 50° C. to 380° C. at temperature rise rate of 20° C./minute

[Chemical Resistance]

For the purpose of evaluation of the chemical resistance of a resulting copolymer, after addition of 20 mL of one solvent selected from the group consisting of hexafluoroisopropanol, dichloromethane, N-methyl-2-pyrrolidone and p-chlorophenol to 500 mg of the copolymer, the mixture was stirred at 80° C. for hours, and an insoluble content was removed. The solvent was then removed by vacuum removal, and a soluble content dissolved in the solvent was obtained. The weight fraction of the soluble content in the copolymer was then calculated. The lower weight fraction of the obtained soluble content indicates that the resulting copolymer has the more excellent chemical resistance.

[Reference Example 1] Cyclic Polyphenylene Sulfide

In a stainless steel autoclave equipped with an agitator, 140.3 g (1.20 mol) of a 48 wt % sodium hydrosulfide aqueous solution, 125.0 g (1.44 mol) of a 48 wt % sodium hydroxide aqueous solution prepared from 96% sodium hydroxide, 6,150 g of N-methyl-2-pyrrolidone (NMP) and 180.8 g (1.23 mol) of p-dichlorobenzene (p-DCB) were mixed. After the reaction vessel was sufficiently substituted with nitrogen, the reaction vessel was sealed under nitrogen gas.

The reaction vessel was heated from room temperature to 200° C. over about 1 hour with stirring at 400 rpm. In this stage, the internal pressure of the reaction vessel was 0.35 MPa as the gauge pressure. The reaction vessel was subsequently heated from 200° C. to 270° C. over about 30 minutes. In this stage, the internal pressure of the reaction vessel was 1.05 MPa as the gauge pressure. The reaction vessel was kept at 270° C. for 1 hour and was subsequently quenched to about room temperature, and the content was collected.

The obtained content was analyzed by gas chromatography and high-performance liquid chromatography. The p-DCB consumption rate of the monomer was 93%, and the formation rate of cyclic PPS was 18.5% on the assumption that the sulfur content of the reaction mixture was fully converted to cyclic PPS.

After dilution of 5,000 g of the obtained content with about 15,000 g of ion exchanged water, the dilution was filtered through a glass filter having the average pore size of 10 to 16 μm. The series of operations of dispersing the filtered component in about 3,000 g of ion exchanged water, stirring the dispersion at 70° C. for 30 minutes and filtering the dispersion again as described above were repeated three times, and a white solid was obtained. A dried solid was obtained by vacuum drying this white solid at 80° C. overnight.

The obtained solid substance was treated by Soxhlet extraction at 70° C. for about 5 hours using chloroform, so that a low molecular-weight content included in the solid substance was separated.

After removal of the solvent from an extract obtained by extraction with chloroform, a slurry was prepared by addition of about 50 g of chloroform and was dropped with stirring to about 1,500 g of methanol. A resulting precipitate was filtered to be recovered and was vacuum dried at 70° C. for 5 hours, so that 11.9 g of white powder was obtained. The absorption spectrum of infrared spectroscopic analysis identified this white powder as a compound of phenylene sulfide unit. Mass spectrometry (apparatus: M-1200H manufactured by Hitachi, Ltd.) of the components separated by high-performance liquid chromatography and the molecular weight information by MALDI-TOF-MS identified this white powder as a cyclic polyphenylene sulfide, which included about 98% by weight of a cyclic compound having p-phenylene sulfide unit as the primary structural unit and the number of repeating units of 4 to 13. Hereinafter this white powder is called cyclic polyphenylene sulfide (cPPS) of Reference Example 1. The result of SEC measurement showed that the cyclic polyphenylene sulfide of Reference Example 1 was fully soluble in 1-chloronaphthalene at room temperature and had the weight average molecular weight of 900.

[Reference Example 2] Cyclic Polyphenylene Sulfide

In a stainless steel autoclave equipped with an agitator, 28.06 g (0.24 mol) of a 48 wt % sodium hydrosulfide aqueous solution, 25.00 g (0.29 mol) of a 48 wt % sodium hydroxide aqueous solution prepared from 96% sodium hydroxide, 1167 g of N-methyl-2-pyrrolidone (NMP) and 36.16 g (0.25 mol) of p-dichlorobenzene (p-DCB) were mixed. After the reaction vessel was sufficiently substituted with nitrogen, the reaction vessel was sealed under nitrogen gas.

The reaction vessel was heated from room temperature to 200° C. over about 1 hour with stirring at 400 rpm. The reaction vessel was subsequently heated from 200° C. to 250° C. over about 30 minutes. In this stage, the internal pressure of the reaction vessel was 0.54 MPa as the gauge pressure. The reaction vessel was kept at 250° C. for 2 hours and was subsequently quenched to about room temperature, and the content was collected.

The obtained content was analyzed by gas chromatography and high-performance liquid chromatography. The p-DCB consumption rate of the monomer was 96%, and the formation rate of cyclic PPS was 16% on the assumption that the sulfur content of the reaction mixture was fully converted to cyclic PPS.

After dilution of 500 g of the obtained content with about 1500 g of ion exchanged water, the dilution was filtered through a glass filter having the average pore size of 10 to 16 μm. The series of operations of dispersing the filtered component in about 300 g of ion exchanged water, stirring the dispersion at 70° C. for 30 minutes and filtering the dispersion again as described above were repeated three times, and a white solid was obtained. A dried solid was obtained by vacuum drying this white solid at 80° C. overnight.

The obtained solid substance was treated by Soxhlet extraction at 70° C. for about 5 hours using chloroform, so that a low molecular-weight content included in the solid substance was separated.

After removal of the solvent from an extract obtained by extraction with chloroform, a slurry was prepared by addition of about 5 g of chloroform and was dropped with stirring to about 150 g of methanol. A resulting precipitate was filtered to be recovered and was vacuum dried at 70° C. for 5 hours, so that 11.2 g of white powder was obtained. The absorption spectrum of infrared spectroscopic analysis identified this white powder as a compound of phenylene sulfide unit. Mass spectrometry (apparatus: M-1200H manufactured by Hitachi, Ltd.) of the components separated by high-performance liquid chromatography and the molecular weight information by MALDI-TOF-MS identified this white powder as a cyclic polyphenylene sulfide, which included about 98% by weight of a cyclic compound having p-phenylene sulfide unit as the primary structural unit and the number of repeating units of 4 to 13. Hereinafter this white powder is called cyclic polyphenylene sulfide (cPPS) of Reference Example 2. The result of SEC measurement showed that the cyclic polyphenylene sulfide of Reference Example 2 was fully soluble in 1-chloronaphthalene at room temperature and had the weight average molecular weight of 900.

[Reference Example 3] Cyclic Polycarbonate

A cyclic polycarbonate of Reference Example 3 was synthesized by the method described in Macromolecules, vol. 24, 3037 page (1991).

In a 1 L three-necked recovery flask equipped with stirring blades and a condenser tube, 200 mL of dichloromethane, 7 mL of distilled water, 3 mL of a 9.75 M sodium hydroxide aqueous solution and 2.4 mL of triethylamine were mixed. While the mixed solution was kept at 30° C. with stirring at 400 rpm, 200 mL of a 1.0 M dichloromethane solution of bisphenol A bis(chloroformate) was added to the system at a rate of 5.7 mL/minute by using a tube pump. Simultaneously 59 mL of the 9.75 M sodium hydroxide aqueous solution was dropped over 25 minutes using a dropping funnel, and 2.4 mL of triethylamine was dropped over 28 minutes using a syringe pump. After addition of bisphenol A bis(chloroformate), the mixture was stirred for 10 minutes. Stirring was then stopped, and an organic layer was taken out. The organic layer was washed with 1.0 M hydrochloric acid and was subsequently washed with distilled water three times. The organic layer was then concentrated and dried. A resulting crude product was treated by a precipitation operation using acetone as the good solvent and water as the poor solvent. A resulting product was vacuum dried at 80° C. for 12 hours, so that 36.2 g of a white solid was obtained (yield: 71.2%). Analyses by $1^H$-NMR, FT-IR and high-performance liquid chromatography identified the obtained white solid as 2- to 15-mer cyclic polycarbonates. Hereinafter this white solid is called cyclic polycarbonate of Reference Example 3.

[Reference Example 4] Cyclic Polysulfone

A cyclic polysulfone of Reference Example 4 was synthesized by the method described in JP H03-08828A. In a 5 L three-necked recovery flask equipped with agitating blades, a condenser tube and a Dean-Stark apparatus, 1,500 mL of dimethylsulfoxide and 800 mL of toluene were mixed. The mixed solution was heated at 135° C. with stirring to reflux. During reflux with heating, 100 mL of a 0.5 M dimethylsulfoxide solution of bis(4-fluorophenyl)sulfone and 100 mL of a 0.5 M aqueous solution of disodium salt of bis(4-hydroxyphenyl)sulfone were added simultaneously at a rate of 0.33 mL/minute using a methalol pump. The mixture was continuously heated for 15 hours, while water/toluene azeotropic mixture was distilled out by the Dean-Stark apparatus and simultaneously the distilled-out toluene was added to keep the concentration unchanged. After the reaction mixture was cooled down to room temperature, 5 mL of acetic anhydride was added to the reaction mixture. The reaction solution was concentrated to 200 mL and was subsequently dropped in about 3000 mL of water. A precipitate obtained was recovered by filtration and was washed with methanol several times. A resulting white solid was heated and dried at 80° C. for 6 hours, and 20 g of an obtained crude product was mixed with 100 mL of dimethylformamide. A white precipitate obtained was filtrated and was washed with methanol. A resulting product was dried in a vacuum drier at 80° C. for 12 hours, so that 5.2 g of a white solid was obtained (yield: 22.4%). Analyses by $1^H$-NMR, FT-IR and high-performance liquid chromatography identified the obtained white solid as 4- to 6-mer cyclic polysulfones. Hereinafter this white solid is called cyclic polysulfone of Reference Example 4.

[Reference Example 5] Cyclic Poly(Phenylene Ether Ether Ketone) Composition

In a stainless steel autoclave equipped with an agitator, 10.91 g (0.05 mol) of 4,4'-difluorobenzophenone, 5.51 g (0.05 mol) of hydroquinone, 6.91 g (0.05 mol) of anhydrous potassium carbonate and 486 g of N-methyl-2-pyrrolidone were mixed. After the reaction vessel was sufficiently substituted with nitrogen, the reaction vessel was sealed under nitrogen gas.

The reaction vessel was heated from room temperature to 140° C. with stirring at 400 rpm and was kept at 140° C. for 1 hour. The reaction vessel was subsequently heated to 180° C., was kept at 180° C. for 3 hours, was further heated to 230° C. and was kept at 230° C. for 5 hours. After the reaction vessel was cooled down to about room temperature, the content was recovered.

A sample for high-performance liquid chromatography was prepared by weighing about 0.2 g of the obtained content, diluting the weighed content with about 4.5 g of THF and separating and removing a THF insoluble content by filtration, and was analyzed. The analysis of the reaction mixture confirmed production of seven cyclic poly(phenylene ether ether ketone)s having the repeating number m=2 to 8.

A slurry was prepared by adding 150 g of a 1 wt % acetic acid aqueous solution to 50 g of the above content thus obtained with stirring, and was heated to 70° C. with stirring for 30 minutes. A filtered component was obtained by filtration of the slurry through a glass filter (average pore size of 10 to 16 μm). The series of operations of dispersing the filtered component in 50 g of ion exchanged water, stirring the dispersion at 70° C. for 30 minutes and filtering the dispersion again as described above were repeated three times, and a white solid was obtained. A dried solid was obtained by vacuum drying this white solid at 80° C. overnight.

The obtained dried solid was placed on a cylindrical filter and was treated by Soxhlet extraction for about 5 hours using chloroform as the solvent, so that a low molecular-weight content included in the dried solid was separated.

After removal of the solvent from an extract obtained by extraction with chloroform, a slurry was prepared by addition of about 2 g of chloroform and was dropped with stirring to about 30 g of methanol. A resulting precipitate was filtered to be recovered and was vacuum dried at 70° C. for 5 hours, so that a white solid was obtained. The absorption spectrum of infrared spectroscopic analysis identified this white powder as a compound of phenylene ether ketone unit. Analysis by high-performance liquid chromatography identified this white powder as a cyclic poly(phenylene ether ether ketone) composition in which the weight fraction of a cyclic poly(phenylene ether ether ketone) mixture was 85%. A component other than the cyclic poly(phenylene ether ether ketone) in the cyclic poly(phenylene ether ether ketone) composition was a linear poly(phenylene ether ether ketone) oligomer. Hereinafter this white powder is called cyclic poly(phenylene ether ether ketone) (cPEEK) of Reference Example 5.

[Reference Example 6] Polyphenylene Sulfide Component Block (A-1)

In a test tube equipped with stirring blades, a pressure-reducing adapter and a vacuum stirrer, 5 g of the cyclic polyphenylene sulfide of Reference Example 1 (46.2 mmol of phenylene sulfide repeating unit) and 122 mg (0.92 mmol) of sodium thiophenoxide as the polymerization initiator were mixed. After substitution of the system with nitrogen, the mixture was heated to 320° C. in a nitrogen atmosphere using an electric tube furnace. Stirring was started after 5 minutes of the start of heating with confirmation that the content was melted, and the reaction proceeded for 1.5 hours after the start of heating. After completion of the reaction, the test tube was taken out of the electric tube furnace and was cooled down to room temperature under nitrogen. This gave polyphenylene sulfide having sodium thiophenoxide at one terminal (A-1). As the result of measurement of melting point using a differential scanning calorimeter, the melting point was 280° C. As the result of SEC measurement, the number-average molecular weight was 14,800, the weight-average molecular weight was 27,800, and the maximum peak molecular weight was 16,900.

[Reference Example 7] Polyphenylene Sulfide Component Block (A-2)

In a test tube equipped with stirring blades, a pressure-reducing adapter and a vacuum stirrer, 1 g of the cyclic polyphenylene sulfide of Reference Example 2 (9.16 mmol of phenylene sulfide repeating unit) and 24.2 mg (0.18 mmol) of sodium thiophenoxide as the polymerization initiator were mixed. After substitution of the system with nitrogen, the mixture was heated to 320° C. in a nitrogen atmosphere using an electric tube furnace. The reaction proceeded for 1 hour with stirring at 50 rpm. After completion of the reaction, the test tube was taken out of the electric tube furnace and was cooled down to room temperature under nitrogen. This gave polyphenylene sulfide having sodium thiophenoxide at one terminal (A-2). As the result of measurement of melting point using a differential scanning calorimeter, the melting point was 280° C. As the result of measurement of molecular weight by SEC, the number-average molecular weight was 15,000, the weight-average molecular weight was 28,200, and the maximum peak molecular weight was 17,100.

[Reference Example 8] Polyphenylene Sulfide Component Block (A-3)

Polyphenylene sulfide having sodium thiophenoxide at one terminal (A-3) was obtained by the same method as that of Reference Example 7 except using 12.11 mg (0.09 mmol) of sodium thiophenoxide as the polymerization initiator. As the result of measurement of melting point using a differential scanning calorimeter, the melting point was 282° C. As the result of measurement of molecular weight by SEC, the number-average molecular weight was 20,300, the weight-average molecular weight was 50,600, and the maximum peak molecular weight was 23,100.

[Reference Example 9] Polyphenylene Sulfide Component Block (A-4)

Polyphenylene sulfide having sodium thiophenoxide at both terminals (A-4) was obtained by the same method as that of Reference Example 6 except using 48.5 mg (0.19 mol) of disodium salt of 4,4'-biphenyldithiol as the polymerization initiator. As the result of measurement of melting point using a differential scanning calorimeter, the melting point was 282° C. As the result of SEC measurement, the number-average molecular weight was 28,700, the weight-average molecular weight was 68,900, and the maximum peak molecular weight was 31,100.

[Reference Example 10] Polyphenylene Sulfide Component Block (A-5)

Polyphenylene sulfide having sodium thiophenoxide at both terminals (A-5) was obtained by the same method as that of Reference Example 7 except using 9.7 mg (0.04 mmol) of disodium salt of 4,4'-biphenyldithiol as the polymerization initiator. As the result of measurement of melting point using a differential scanning calorimeter, the melting point was 275° C. As the result of measurement of molecular weight by SEC, the number-average molecular weight was 28,700, the weight-average molecular weight was 72,500, and the maximum peak molecular weight was 32,000.

[Reference Example 11] Polyphenylene Sulfide Component Block (B-1) without Using Cyclic Compound as Raw Material In a stainless steel autoclave equipped with an agitator, 5.85 g (0.05 mol) of a 48 wt % sodium hydrosulfide aqueous solution, 5.21 g (0.06 mol) of a 48 wt % sodium hydroxide aqueous solution prepared from 96% sodium hydroxide, 1080 g of N-methyl-2-pyrrolidone (NMP) and 108 g of the chloroform extract residue (polyphenylene sulfide) synthesized in Reference Example 1 were mixed. After repetition of substitution with nitrogen three times, the mixture was heated to 250° C. over 45 minutes with stirring at 400 rpm. The reaction then proceeded at 250° C. for 1 hour for thiolation of the terminal by depolymerization of the polyphenylene sulfide. The reaction solution was cooled down and was then added to 5000 g of deionized water. A resulting precipitate was filtrated and was washed with deionized water at 80° C. several times. A resulting white solid was then vacuum dried at 80° C. for 8 hours, so that a polyphenylene sulfide (B-1) was obtained. As the result of measurement of melting point using a differential scanning calorimeter, the melting point was 277° C. As the result of SEC measurement, the number-average molecular weight of the obtained polymer was 6,200, the weight-average molecular weight was 16,100, and the maximum peak molecular weight was 7,500.

[Reference Example 12] Polyphenylene Sulfide Component Block (B-2) without Using Cyclic Compound as Raw Material In a stainless steel autoclave equipped with an agitator, 28.06 g (0.24 mol) of a 48 wt % sodium hydrosulfide aqueous solution, 25.00 g (0.29 mol) of a 48 wt % sodium hydroxide aqueous solution prepared from 96% sodium hydroxide, 123 g of N-methyl-2-pyrrolidone (NMP) and 33.81 g (0.23 mol) of p-dichlorobenzene (p-DCB) were mixed. The reaction vessel was sealed in nitrogen gas at room temperature and ordinary pressure and was then heated from room temperature to 200° C. over about 1 hour with stirring at 400 rpm. The reaction vessel was subsequently heated from 200° C. to 250° C. over about 30 minutes. The reaction vessel was kept at 270° C. for 2 hours and was subsequently quenched to about room temperature, and the content was collected.

After dilution of 50 g of the obtained content with about 150 g of ion exchanged water, the dilution was filtered through a glass filter having the average pore size of 10 to 16 μm to give a filtered component. The series of operations of dispersing the filtered component in about 300 g of ion exchanged water, stirring the dispersion at 70° C. for 30 minutes and filtering the dispersion again as described above were repeated three times, and a white solid was obtained. A dried solid was obtained as a polyphenylene sulfide component block (B-2) by vacuum drying this white solid at 80° C. overnight. As the result of measurement of melting point using a differential scanning calorimeter, the melting point was 280° C. As the result of SEC measurement, the number-average molecular weight of the obtained polymer was 24,500, the weight-average molecular weight was 66,200, and the maximum peak molecular weight was 37,200.

[Reference Example 13] Polyamide Component Block (C-1)

In a test tube equipped with stirring blades, 1 g (5.1 mmol) of ω-laurolactam and 109 mg (0.38 mmol) of potassium ethoxide and 1.0 mg ($6.44 \times 10^{-3}$ mmol) of N-acetyl-ε-caprolactam as the polymerization initiators were mixed. After substitution of the system with nitrogen, the mixture was heated to 200° C. in a nitrogen atmosphere using an electric tube furnace. Stirring was started after 5 minutes of the start of heating with confirmation that the content was melted, and the reaction proceeded for 3.0 hours after the start of heating. After completion of the reaction, the test tube was taken out of the electric tube furnace and was cooled down to room temperature under nitrogen. This gave polyamide (C-1). As the result of measurement of melting point using a differential scanning calorimeter, the melting point was 174° C.

[Reference Example 14] Polyester Component Block (C-2)

In a test tube equipped with stirring blades, a pressure-reducing adapter and a vacuum stirrer, 1.2 g of cyclic polybutylene terephthalate (CBT (registered trademark) 100 manufactured by Cyclics Corporation) and 122 mg (0.92 mmol) of sodium thiophenoxide as the polymerization initiator were mixed. After substitution of the system with nitrogen, the mixture was heated to 250° C. in a nitrogen atmosphere using an electric tube furnace. Stirring was started after 5 minutes of the start of heating with confirmation that the content was melted, and the reaction proceeded for 3.0 hours after the start of heating. After completion of the reaction, the test tube was taken out of the electric tube furnace and was cooled down to room temperature under nitrogen. This gave polyester having thiophenoxide at one terminal (C-2). As the result of measurement of melting point using a differential scanning calorimeter, the melting point was 228° C.

[Reference Example 15] Polycarbonate Component Block (C-3)

In a test tube equipped with stirring blades, a pressure-reducing adapter and a vacuum stirrer, 5 g of the cyclic polycarbonate of Reference Example 3 and 109 mg (0.44 mmol) of sodium thiophenoxide as the polymerization initiator were mixed. After substitution of the system with nitrogen, the mixture was heated to 300° C. in a nitrogen atmosphere using an electric tube furnace. Stirring was started after 5 minutes of the start of heating with confirmation that the content was melted, and the reaction proceeded for 0.5 hours after the start of heating. After completion of the reaction, the test tube was taken out of the electric tube furnace and was cooled down to room temperature under nitrogen. This gave polycarbonate having thiophenoxide at one terminal (C-3). As the result of measurement of melting point using a differential scanning calorimeter, the melting point was 251° C.

[Reference Example 16] Polysulfone Component Block (C-4)

In a test tube equipped with stirring blades, a pressure-reducing adapter and a vacuum stirrer, 5 g of the cyclic polysulfone of Reference Example 4 and 109 mg (0.44 mmol) of sodium thiophenoxide as the polymerization initiator were mixed. After substitution of the system with nitrogen, the mixture was heated to 300° C. in a nitrogen atmosphere using an electric tube furnace. Stirring was started after 5 minutes of the start of heating with confirmation that the content was melted, and the reaction proceeded for 0.5 hours after the start of heating. After completion of the reaction, the test tube was taken out of the electric tube furnace and was cooled down to room temperature under nitrogen. This gave polysulfone having thiophenoxide at one terminal (C-4).

[Reference Example 17] Poly(Phenylene Ether Ether Ketone) Component Block (C-5)

In a test tube equipped with stirring blades, a pressure-reducing adapter and a vacuum stirrer, 5 g of the cyclic poly(phenylene ether ether ketone) of Reference Example 5 and 46 mg (0.35 mmol) of sodium thiophenoxide as the polymerization initiator were mixed. After substitution of the system with nitrogen, the mixture was heated to 340° C. in a nitrogen atmosphere using an electric tube furnace. Stirring was started after 5 minutes of the start of heating with confirmation that the content was melted, and the reaction proceeded for 1.0 hour after the start of heating. After completion of the reaction, the test tube was taken out of the electric tube furnace and was cooled down to room temperature under nitrogen. This gave poly(phenylene ether ether ketone) having thiophenoxide at one terminal (C-5). As the result of measurement of melting point using a differential scanning calorimeter, the melting point was 341° C.

[Reference Example 18] Poly(Phenylene Ether Ether Ketone) Component Block (D-1) without Using Cyclic Compound as Raw Material In a stainless steel autoclave equipped with an agitator, 11.46 g (52.5 mmol) of 4,4'-difluorobenzophenone, 5.51 g (50 mmol) of hydroquinone, 6.91 g (50 mmol) of anhydrous potassium carbonate and 58 g of N-methyl-2-pyrrolidone were mixed. The reaction vessel was sealed in nitrogen gas at room temperature and ordinary pressure and was then heated from room temperature to 140° C. with stirring at 400 rpm and was kept at 140° C. for 1 hour. The reaction vessel was subsequently heated to 180° C. and was kept at 180° C. for 3 hours. The reaction vessel was further heated to 230° C., was kept at 230° C. for 5 hours and was subsequently quenched to about room temperature, and the content was collected.

A slurry was prepared by adding 150 g of a 1 wt % acetic acid aqueous solution to 50 g of the above content thus obtained with stirring, and was heated to 70° C. with stirring for 30 minutes. A filtered component was obtained by filtration of the slurry through a glass filter (average pore size of 10 to 16 μm). The series of operations of dispersing the filtered component in 50 g of ion exchanged water, stirring the dispersion at 70° C. for 30 minutes and filtering the dispersion again as described above were repeated three times, and a white solid was obtained. A dried solid was obtained as a poly(phenylene ether ether ketone) component block (D-1) by vacuum drying this white solid at 80° C. overnight. As the result of measurement of melting point using a differential scanning calorimeter, the melting point was 339° C. This dried solid was insoluble in 1-chloronaphthalene as the eluent of SEC measurement at 250° C.

[Example 1] Polyphenylene Sulfide-Polyamide Block Copolymer

In a test tube equipped with stirring blades, a vacuum stirrer, a nitrogen introducing tube and a reflux tube, 1 g of the cryo-milled powder of the polyphenylene sulfide component block (A-1) obtained in Reference Example 6 and 1 g (5.1 mmol) of ω-laurolactam were mixed, and the test tube was substituted with nitrogen three times. With stirring in nitrogen stream, the test tube was heated from room temperature to 200° C. over 30 minutes and was subsequently heated to 250° C. over 60 minutes. The test tube was then heated from 250° C. to 300° C. over 30 minutes and was kept at 300° C. for 2 hours. Stirring was then stopped, and the content in the test tube was ejected into water. A resulting brown solid was vacuum dried at 80° C. for 12 hours, so that a polyphenylene sulfide-polyamide block copolymer was obtained. As the result of SEC measurement of the obtained polymer, the number-average molecular weight was 22,500, and the maximum peak molecular weight was 24,800, and the chromatogram was unimodal. As the result of evaluation for the melt homogeneity with an optical microscope, no coarse phase separated structure attributed to the homopolymer was observed, and the obtained copolymer was homogeneous. The weight fraction of a soluble content in hexafluoroisopropanol was 34% by weight. The results are shown in Table 1.

[Example 2] Polyphenylene Sulfide-Polyamide Block Copolymer

A polyphenylene sulfide-polyamide block copolymer was obtained by the same method as that of Example 1 except using (A-4) as the polyphenylene sulfide component block. As the result of SEC measurement of the obtained polymer, the number-average molecular weight was 35,200, and the maximum peak molecular weight was 38,100, and the chromatogram was unimodal. As the result of evaluation for the melt homogeneity with an optical microscope, no coarse separated structure attributed to the homopolymer was observed, and the obtained copolymer was homogeneous. The weight fraction of a soluble content in hexafluoroisopropanol was 39% by weight. The results are shown in Table 1.

[Example 3] Polyphenylene Sulfide-Polyamide Block Copolymer

In a test tube equipped with stirring blades, a vacuum stirrer, a nitrogen introducing tube and a reflux tube, 1 g of the cryo-milled powder of the polyamide component block (C-1) obtained in Reference Example 13 and 1 g (9.16 mmol) of the cyclic polyphenylene sulfide obtained in Reference Example 1 were mixed, and the test tube was substituted with nitrogen three times. With stirring in nitrogen stream, the test tube was heated from room temperature to 200° C. over 30 minutes and was subsequently heated to 250° C. over 60 minutes. The test tube was then heated from 250° C. to 300° C. over 30 minutes and was kept at 300° C. for 2 hours. Stirring was then stopped, and the content in the test tube was ejected into water. A resulting brown solid was vacuum dried at 80° C. for 12 hours, so that a polyphenylene sulfide-polyamide block copolymer was obtained. As the result of SEC measurement of the obtained polymer, the number-average molecular weight was 42,600, and the maximum peak molecular weight was 44,800, and the chromatogram was unimodal. As the result of evaluation for the melt homogeneity with an optical microscope, no coarse phase separated structure attributed to the homopolymer was observed, and the obtained copolymer was homogeneous. The weight fraction of a soluble content in hexafluoroisopropanol was 22% by weight. The results are shown in Table 1.

Comparative Example 1

A copolymer was synthesized by the same method as that of Example 1 except using (B-1) as the polyphenylene sulfide component block. As the result of SEC measurement of the obtained polymer, the number-average molecular weight was 9,500, and the maximum peak molecular weight was 11,500, and the chromatogram was multimodal with a peak attributed to the remaining homo polyphenylene sulfide. As the result of evaluation for the melt homogeneity with an optical microscope, coarse separated structure attributed to the homopolymer was observed, and the obtained copolymer was heterogeneous. The weight fraction of a soluble content in hexafluoroisopropanol was 68% by weight. The results are shown in Table 1.

Example 4 except using (A-4) as the polyphenylene sulfide component block. As the result of SEC measurement of the obtained polymer, the number-average molecular weight was 34,000, and the maximum peak molecular weight was 37,600, and the chromatogram was unimodal. As the result of evaluation for the melt homogeneity with an optical microscope, no coarse separated structure attributed to the homopolymer was observed, and the obtained copolymer was homogeneous. The weight fraction of a soluble content in hexafluoroisopropanol was 30% by weight. The results are shown in Table 2.

[Example 6] Polyphenylene Sulfide-Polybutylene Terephthalate Block Copolymer

In a test tube equipped with stirring blades, a vacuum stirrer and a nitrogen introducing tube, 1 g of the cryo-milled powder of the polybutylene terephthalate component block (C-2) obtained in Reference Example 14 and 1 g (9.16 mmol) of the cyclic polyphenylene sulfide obtained in Reference Example 1 were mixed, and the test tube was substituted with nitrogen three times. The test tube was

TABLE 1

| | PPS Component Block Raw Material | PA Component Block Raw Material | Molecular Weight Distribution Profile | Melt Homogeneity | HFIP Soluble Content |
|---|---|---|---|---|---|
| EX 1 | A-1 | ω-Laurolactam | Unimodal | Homogeneous | 34 wt % |
| EX 2 | A-4 | ω-Laurolactam | Unimodal | Homogeneous | 39 wt % |
| EX 3 | Cyclic PPS | C-1 | Unimodal | Homogeneous | 22 wt % |
| COMP EX 1 | B-1 | ω-Laurolactam | Multimodal | Heterogeneous | 68 wt % |

* PPS: polyphenylene sulfide. PA: polyamide HFIP: hexafluoroisopropanol

[Example 4] Polyphenylene Sulfide-Polybutylene Terephthalate Block Copolymer

In a test tube equipped with stirring blades, a vacuum stirrer and a nitrogen introducing tube, 1 g of the cryo-milled powder of the polyphenylene sulfide component block (A-1) obtained in Reference Example 6 and 1.2 g (5.45 mmol) of cyclic polybutylene terephthalate (CBT (registered trademark) 100 manufactured by Cyclics Corporation) were mixed, and the test tube was substituted with nitrogen three times. The test tube was heated from room temperature to 200° C. over 30 minutes in nitrogen stream and was subsequently heated to 250° C. over 60 minutes with stirring. The test tube was further heated from 250° C. to 280° C. over 15 minutes, and the reaction was completed. The content in the test tube was ejected into water. A resulting brown solid was vacuum dried at 50° C. for 12 hours, so that a polyphenylene sulfide-polybutylene terephthalate copolymer was obtained. As the result of SEC measurement of the obtained polymer, the number-average molecular weight was 19,100, and the maximum peak molecular weight was 23,400, and the chromatogram was unimodal. As the result of evaluation for the melt homogeneity with an optical microscope, no coarse phase separated structure attributed to the homopolymer was observed, and the obtained copolymer was homogeneous. The weight fraction of a soluble content in hexafluoroisopropanol was 22% by weight. The results are shown in Table 2.

[Example 5] Polyphenylene Sulfide-Polybutylene Terephthalate Block Copolymer

A polyphenylene sulfide-polybutylene terephthalate block copolymer was obtained by the same method as that of heated from room temperature to 200° C. over 30 minutes in nitrogen stream and was subsequently heated to 250° C. over 60 minutes with stirring. The test tube was further heated from 250° C. to 280° C. over 15 minutes, and the reaction was completed. The content in the test tube was ejected into water. A resulting brown solid was vacuum dried at 50° C. for 12 hours, so that a polyphenylene sulfide-polybutylene terephthalate copolymer was obtained. As the result of SEC measurement of the obtained polymer, the number-average molecular weight was 23,100, and the maximum peak molecular weight was 26,500, and the chromatogram was unimodal. As the result of evaluation for the melt homogeneity with an optical microscope, no coarse phase separated structure attributed to the homopolymer was observed, and the obtained copolymer was homogeneous. The weight fraction of a soluble content in hexafluoroisopropanol was 15% by weight. The results are shown in Table 2.

Comparative Example 2

A copolymer was synthesized by the same method as that of Example 4 except using (B-1) as the polyphenylene sulfide component block. As the result of SEC measurement of the obtained polymer, the number-average molecular weight was 8,700, and the maximum peak molecular weight was 10,300, and the chromatogram was multimodal with a peak attributed to the remaining homo polyphenylene sulfide. As the result of evaluation for the melt homogeneity with an optical microscope, coarse separated structure attributed to the homopolymer was observed, and the obtained copolymer was heterogeneous. The weight fraction of a soluble content in hexafluoroisopropanol was 61% by weight. The results are shown in Table 2.

TABLE 2

|  | PPS Component Block Raw Material | PBT Component Block Raw Material | Molecular Weight Distribution Profile | Melt Homogeneity | HFIP Soluble Content |
|---|---|---|---|---|---|
| EX 4 | A-1 | Cyclic PBT | Unimodal | Homogeneous | 22 wt % |
| EX 5 | A-4 | Cyclic PBT | Unimodal | Homogeneous | 30 wt % |
| EX 6 | Cyclic PPS | C-2 | Unimodal | Homogeneous | 15 wt % |
| COMP EX 2 | B-1 | Cyclic PBT | Multimodal | Heterogeneous | 61 wt % |

* PPS: polyphenylene sulfide. PBT: polybutylene terephthalate HFIP: hexafluoroisopropanol

[Example 7] Polyphenylene Sulfide-Polycarbonate Block Copolymer

In a test tube equipped with stirring blades, a vacuum stirrer and a nitrogen introducing tube, 1 g of the cryo-milled powder of the polyphenylene sulfide component block (A-1) obtained in Reference Example 6 and 1.2 g (4.72 mmol) of the cyclic polycarbonate obtained in Reference Example 3 were mixed, and the test tube was substituted with nitrogen three times. The test tube was heated from room temperature to 200° C. over 30 minutes in nitrogen stream and was subsequently heated to 250° C. over 60 minutes with stirring. The test tube was further heated from 250° C. to 300° C. over 45 minutes, and the reaction was completed. The content in the test tube was ejected into water. A resulting brown solid was vacuum dried at 80° C. for 12 hours, so that a polyphenylene sulfide-polycarbonate copolymer was obtained. As the result of SEC measurement of the obtained polymer, the number-average molecular weight was 22,200, and the maximum peak molecular weight was 24,900, and the chromatogram was unimodal. As the result of evaluation for the melt homogeneity with an optical microscope, no coarse phase separated structure attributed to the homopolymer was observed, and the obtained copolymer was homogeneous. The weight fraction of a soluble content in dichloromethane was 12% by weight. The results are shown in Table 3.

[Example 8] Polyphenylene Sulfide-Polycarbonate Block Copolymer

A polyphenylene sulfide-polycarbonate copolymer was obtained by the same method as that of Example 7 except using (A-4) as the polyphenylene sulfide component block. As the result of SEC measurement of the obtained polymer, the number-average molecular weight was 35,700, and the maximum peak molecular weight was 39,300, and the chromatogram was unimodal. As the result of evaluation for the melt homogeneity with an optical microscope, no coarse separated structure attributed to the homopolymer was observed, and the obtained copolymer was homogeneous. The weight fraction of a soluble content in dichloromethane was 20% by weight. The results are shown in Table 3.

[Example 9] Polyphenylene Sulfide-Polycarbonate Block Copolymer

In a test tube equipped with stirring blades, a vacuum stirrer and a nitrogen introducing tube, 1.2 g of the cryo-milled powder of the polycarbonate component block (C-3) obtained in Reference Example 15 and 1 g (9.16 mmol) of the cyclic polyphenylene sulfide obtained in Reference Example 1 were mixed, and the test tube was substituted with nitrogen three times. The test tube was heated from room temperature to 200° C. over 30 minutes in nitrogen stream and was subsequently heated to 250° C. over 60 minutes with stirring. The test tube was further heated from 250° C. to 320° C. over 45 minutes, and the reaction was completed. The content in the test tube was ejected into water. A resulting brown solid was vacuum dried at 80° C. for 12 hours, so that a polyphenylene sulfide-polycarbonate copolymer was obtained. As the result of SEC measurement of the obtained polymer, the number-average molecular weight was 22,200, and the maximum peak molecular weight was 24,900, and the chromatogram was unimodal. As the result of evaluation for the melt homogeneity with an optical microscope, no coarse phase separated structure attributed to the homopolymer was observed, and the obtained copolymer was homogeneous. The weight fraction of a soluble content in dichloromethane was 5% by weight. The results are shown in Table 3.

Comparative Example 3

A copolymer was synthesized by the same method as that of Example 7 except using (B-1) as the polyphenylene sulfide component block. As the result of SEC measurement of the obtained polymer, the number-average molecular weight was 10,600, and the maximum peak molecular weight was 11,900, and the chromatogram was multimodal with a peak attributed to the remaining homo polyphenylene sulfide. As the result of evaluation for the melt homogeneity with an optical microscope, coarse separated structure attributed to the homopolymer was observed, and the obtained copolymer was heterogeneous. The weight fraction of a soluble content in dichloromethane was 45% by weight. The results are shown in Table 3.

TABLE 3

|  | PPS Component Block Raw Material | PC Component Block Raw Material | Molecular Weight Distribution Profile | Melt Homogeneity | Dichloromethane Soluble Content |
|---|---|---|---|---|---|
| EX 7 | A-1 | Cyclic PC | Unimodel | Homogeneous | 12wt% |
| EX 8 | A-4 | Cyclic PC | Unimodal | Homogeneous | 20wt% |

TABLE 3-continued

| | PPS Component Block Raw Material | PC Component Block Raw Material | Molecular Weight Distribution Profile | Melt Homogeneity | Dichloromethane Soluble Content |
|---|---|---|---|---|---|
| EX 9 | Cyclic PPS | C-3 | Unimodal | Homogeneous | 5wt% |
| COMP EX 3 | B-1 | Cyclic PC | Multimodal | Heterogeneous | 45wt% |

* PPS: polyphenylene sulfide. PC: polycarbonate

[Example 10] Polyphenylene Sulfide-Polysulfone Block Copolymer

In a test tube equipped with stirring blades, a vacuum stirrer and a nitrogen introducing tube, 1 g of the cryo-milled powder of the polyphenylene sulfide component block (A-1) obtained in Reference Example 6 and 1.2 g (5.17 mmol) of the cyclic polysulfone obtained in Reference Example 4 were mixed, and the test tube was substituted with nitrogen three times. The test tube was heated from room temperature to 280° C. over 60 minutes in nitrogen stream and was subsequently heated to 320° C. over 60 minutes with stirring. The content in the test tube was ejected into water. A resulting brown solid was vacuum dried at 80° C. for 12 hours, so that a polyphenylene sulfide-polysulfone copolymer was obtained. As the result of SEC measurement of the obtained polymer, the number-average molecular weight was 21,800, and the maximum peak molecular weight was 24,400, and the chromatogram was unimodal. As the result of evaluation for the melt homogeneity with an optical microscope, no coarse phase separated structure attributed to the homopolymer was observed, and the obtained copolymer was homogeneous. The weight fraction of a soluble content in N-methyl-2-pyrrolidone was 18% by weight. The results are shown in Table 4.

[Example 11] Polyphenylene Sulfide-Polysulfone Block Copolymer

A polyphenylene sulfide-polysulfone copolymer was obtained by the same method as that of Example 10 except using (A-4) as the polyphenylene sulfide component block. As the result of SEC measurement of the obtained polymer, the number-average molecular weight was 34,200, and the maximum peak molecular weight was 38,100, and the chromatogram was unimodal. As the result of evaluation for the melt homogeneity with an optical microscope, no coarse separated structure attributed to the homopolymer was observed, and the obtained copolymer was homogeneous. The weight fraction of a soluble content in N-methyl-2-pyrrolidone was 25% by weight. The results are shown in Table 4.

[Example 12] Polyphenylene Sulfide-Polysulfone Block Copolymer

In a test tube equipped with stirring blades, a vacuum stirrer and a nitrogen introducing tube, 1.2 g of the cryo-milled powder of the polysulfone component block (C-4) obtained in Reference Example 16 and 1 g (9.16 mmol) of the cyclic polyphenylene sulfide obtained in Reference Example 1 were mixed, and the test tube was substituted with nitrogen three times. The test tube was heated from room temperature to 280° C. over 60 minutes in nitrogen stream and was subsequently heated to 320° C. over 60 minutes with stirring. The content in the test tube was ejected into water. A resulting brown solid was vacuum dried at 80° C. for 12 hours, so that a polyphenylene sulfide-polysulfone copolymer was obtained. As the result of SEC measurement of the obtained polymer, the number-average molecular weight was 21,800, and the maximum peak molecular weight was 24,400, and the chromatogram was unimodal. As the result of evaluation for the melt homogeneity with an optical microscope, no coarse phase separated structure attributed to the homopolymer was observed, and the obtained copolymer was homogeneous. The weight fraction of a soluble content in N-methyl-2-pyrrolidone was 10% by weight. The results are shown in Table 4.

Comparative Example 4

A copolymer was synthesized by the same method as that of Example 10 except using (B-1) as the polyphenylene sulfide component block. As the result of SEC measurement of the obtained polymer, the number-average molecular weight was 9,800, and the maximum peak molecular weight was 11,100, and the chromatogram was multimodal with a peak attributed to the remaining homo polyphenylene sulfide. As the result of evaluation for the melt homogeneity with an optical microscope, coarse separated structure attributed to the homopolymer was observed, and the obtained copolymer was heterogeneous. The weight fraction of a soluble content in N-methyl-2-pyrrolidone was 47% by weight. The results are shown in Table 4.

TABLE 4

| | PPS Component Block Raw Material | PSF Component Block Raw Material | Molecular Weight Distribution Profile | Melt Homogeneity | NMP Soluble Content |
|---|---|---|---|---|---|
| EX 10 | A-1 | Cyclic PSF | Unimodal | Homogeneous | 18 wt % |
| EX 11 | A-4 | Cyclic PSF | Unimodal | Homogeneous | 25 wt % |
| EX 12 | Cyclic PPS | C-4 | Unimodal | Homogeneous | 10 wt % |
| COMP EX 4 | B-1 | Cyclic PSF | Multimodal | Heterogeneous | 47 wt % |

* PPS: polyphenylene sulfide. PSF: polysulfone NMP: N-methyl-2-pyrrolidone

[Example 13] Polyphenylene Sulfide-Poly(Phenylene Ether Ether Ketone) Block Copolymer In a glass test tube (24 mm in diameter) equipped with stirring blades, a vacuum stirrer and a nitrogen introducing tube, 0.92 g of the cryo-milled powder of the polyphenylene sulfide component block (A-2) obtained in Reference Example 7 and 0.08 g of the cyclic poly(phenylene ether ether ketone) obtained in Reference Example 5 were mixed. The test tube was substituted with nitrogen at room temperature and ordinary pressure and was then evacuated to about 0.4 kPa with a vacuum pump. After about 10 seconds of the evacuation to about 0.4 kPa, the test tube was placed in an electric tube furnace regulated to temperature of 320° C., was kept at about 0.4 kPa by the vacuum pump and was heated for 90 minutes with stirring at 50 rpm while being devolatilized. The test tube was then taken out of the furnace and was cooled down to room temperature, so that a brown solid polymer was obtained.

The obtained polymer was dissolved at 220° C. in a mixed solvent of 1-chloronaphthalene/p-chlorophenol=6/4 (v/v) and was measured by high-performance liquid chromatography. As the result, the consumption rate of cyclic polyphenylene sulfide was 99%, and the consumption rate of cyclic poly(phenylene ether ether ketone) was 96%. As the result of measurement of melting point and melt crystallization temperature with a differential scanning calorimeter, there were two melting points at 281° C. and 335° C., and the melt crystallization temperature was 176° C. As the result of SEC measurement, the number-average molecular weight was 8,300, and the maximum peak molecular weight was 12,200, and the chromatogram was unimodal. As the result of evaluation for the melt homogeneity with an optical microscope, no coarse separated structure attributed to the homopolymer was observed, and the obtained copolymer was homogeneous. The weight fraction of a soluble content in p-chlorophenol was 0% by weight. The results are shown in Table 5.

[Example 14] Polyphenylene Sulfide-Poly(Phenylene Ether Ether Ketone) Block Copolymer A copolymer was synthesized by the same method as that of Example 13 except using 0.7 g of the cryo-milled powder of the polyphenylene sulfide component block (A-2) obtained in Reference Example 7 and 0.3 g of the cyclic poly(phenylene ether ether ketone) composition obtained in Reference Example 5.

The obtained polymer was dissolved at 220° C. in a mixed solvent of 1-chloronaphthalene/p-chlorophenol=6/4 (v/v) and was measured by high-performance liquid chromatography. As the result, the consumption rate of cyclic polyphenylene sulfide was 98%, and the consumption rate of cyclic poly(phenylene ether ether ketone) was 95%. As the result of measurement of melting point and melt crystallization temperature with a differential scanning calorimeter, there were two melting points at 278° C. and 328° C., and the melt crystallization temperature was 220° C. As the result of SEC measurement, the number-average molecular weight was 25,800, and the maximum peak molecular weight was 29,100, and the chromatogram was unimodal. As the result of evaluation for the melt homogeneity with an optical microscope, no coarse separated structure attributed to the homopolymer was observed, and the obtained copolymer was homogeneous. The weight fraction of a soluble content in p-chlorophenol was 0% by weight. The results are shown in Table 5.

[Example 15] Polyphenylene Sulfide-Poly(Phenylene Ether Ether Ketone) Block Copolymer A copolymer was synthesized by the same method as that of Example 13 except using the cryo-milled powder of the polyphenylene sulfide component block (A-3) obtained in Reference Example 8. The obtained polymer was dissolved at 220° C. in a mixed solvent of 1-chloronaphthalene/p-chlorophenol=6/4 (v/v) and was measured by high-performance liquid chromatography. As the result, the consumption rate of cyclic polyphenylene sulfide was 97%, and the consumption rate of cyclic poly(phenylene ether ether ketone) was 93%. As the result of measurement of melting point and melt crystallization temperature with a differential scanning calorimeter, there were two melting points at 281° C. and 325° C., and the melt crystallization temperature was 221° C. As the result of SEC measurement, the number-average molecular weight was 40,500, and the maximum peak molecular weight was 46,100, and the chromatogram was unimodal. As the result of evaluation for the melt homogeneity with an optical microscope, no coarse separated structure attributed to the homopolymer was observed, and the obtained copolymer was homogeneous. The weight fraction of a soluble content in p-chlorophenol was 0% by weight. The results are shown in Table 5.

[Example 16] Polyphenylene Sulfide-Poly(Phenylene Ether Ether Ketone) Block Copolymer A copolymer was synthesized by the same method as that of Example 13 except using the cryo-milled powder of the polyphenylene sulfide component block (A-5) obtained in Reference Example 10. The obtained polymer was dissolved at 220° C. in a mixed solvent of 1-chloronaphthalene/p-chlorophenol=6/4 (v/v) and was measured by high-performance liquid chromatography. As the result, the consumption rate of cyclic polyphenylene sulfide was 99%, and the consumption rate of cyclic poly(phenylene ether ether ketone) was 95%. As the result of measurement of melting point and melt crystallization temperature with a differential scanning calorimeter, there were two melting points at 269° C. and 313° C., and the melt crystallization temperature was 183° C. As the result of SEC measurement, the number-average molecular weight was 31,300, and the maximum peak molecular weight was 35,400, and the chromatogram was unimodal. As the result of evaluation for the melt homogeneity with an optical microscope, no coarse separated structure attributed to the homopolymer was observed, and the obtained copolymer was homogeneous. The weight fraction of a soluble content in p-chlorophenol was 0% by weight. The results are shown in Table 5.

[Example 17] Polyphenylene Sulfide-Poly(Phenylene Ether Ether Ketone) Block Copolymer In a glass test tube (24 mm in diameter) equipped with stirring blades, a vacuum stirrer and a nitrogen introducing tube, 0.30 g of the cryo-milled powder of the poly(phenylene ether ether ketone) component block (C-5) obtained in Reference Example 17 and 0.70 g of the cyclic polyphenylene sulfide obtained in Reference Example 2 were mixed. The test tube was substituted with nitrogen at room temperature and ordinary pressure and was then evacuated to about 0.4 kPa with a vacuum pump. After about 10 seconds of the evacuation to about 0.4 kPa, the test tube was placed in an electric tube furnace regulated to temperature of 350° C., was kept at about 0.4 kPa by the vacuum pump and was heated for 90 minutes with stirring at 50 rpm while being devolatilized. The test tube was then taken out of the furnace and was cooled down to room temperature, so that a brown solid polymer was obtained.

The obtained polymer was dissolved at 220° C. in a mixed solvent of 1-chloronaphthalene/p-chlorophenol=6/4 (v/v) and was measured by high-performance liquid chromatography. As the result, the consumption rate of cyclic polyphenylene sulfide was 99%, and the consumption rate of cyclic poly(phenylene ether ether ketone) was 95%. As the result of measurement of melting point and melt crystallization temperature with a differential scanning calorimeter, there were two melting points at 269° C. and 313° C., and the melt crystallization temperature was 183° C. As the result of SEC measurement, the number-average molecular weight was 21,300, and the maximum peak molecular weight was 25,400, and the chromatogram was unimodal. As the result of evaluation for the melt homogeneity with an optical microscope, no coarse separated structure attributed to the homopolymer was observed, and the obtained copolymer was homogeneous. The weight fraction of a soluble content in p-chlorophenol was 10% by weight. The results are shown in Table 5.

[Example 18] Polyphenylene Sulfide-Poly(Phenylene Ether Ether Ketone) Block Copolymer A copolymer was synthesized by the same method as that of Example 13 except using 0.5 g of the cryo-milled powder of the polyphenylene sulfide component block (A-2) obtained in Reference Example 7 and 0.5 g of the cyclic poly(phenylene ether ether ketone) composition obtained in Reference Example 5.

The obtained polymer was dissolved at 220° C. in a mixed solvent of 1-chloronaphthalene/p-chlorophenol=6/4 (v/v) and was measured by high-performance liquid chromatography. As the result, the consumption rate of cyclic polyphenylene sulfide was 98%, and the consumption rate of cyclic poly(phenylene ether ether ketone) was 95%. As the result of measurement of melting point and melt crystallization temperature with a differential scanning calorimeter, there were two melting points at 272° C. and 333° C., and the melt crystallization temperature was 226° C. As the result of SEC measurement, the number-average molecular weight was 31,400, and the maximum peak molecular weight was 34,200. As the result of evaluation for the melt homogeneity with an optical microscope, no coarse separated structure attributed to the homopolymer was observed, and the obtained copolymer was homogeneous. The weight fraction of a soluble content in p-chlorophenol was 0% by weight. The results are shown in Table 5.

[Example 19] Production Method of Polyphenylene Sulfide-Poly(Phenylene Ether Ether Ketone) Block Copolymer In a glass test tube (24 mm in diameter) equipped with an agitator, 0.3 g of the cyclic polyphenylene sulfide of Reference Example 1, 0.7 g of the cyclic poly(phenylene ether ether ketone) composition obtained in Reference Example 5 and 1 g of a powder obtained by mixing 5 mol % of sodium benzene thiolato with a compound having a repeating unit of -(Ph-S)— that is the primary structural unit of cyclic polyphenylene sulfide were mixed. The test tube was substituted with nitrogen at room temperature and ordinary pressure. The test tube was placed in an electric furnace regulated to temperature of 360° C. and was heated for 60 minutes with stirring at 50 rpm. The test tube was then taken out and was cooled down to room temperature, so that a brown solid was obtained.

The obtained polymer was dissolved at 220° C. in a mixed solvent of 1-chloronaphthalene/p-chlorophenol=6/4 (v/v) and was measured by high-performance liquid chromatography. As the result, the consumption rate of cyclic polyphenylene sulfide was 92%, and the consumption rate of cyclic poly(phenylene ether ether ketone) was 100%. As the result of measurement of melting point and melt crystallization temperature with a differential scanning calorimeter, the melting point was 302° C. and the melt crystallization temperature was 225° C. As the result of SEC measurement, the number-average molecular weight was 8,300, and the maximum peak molecular weight was 11,900. As the result of evaluation for the melt homogeneity with an optical microscope, no coarse separated structure attributed to the homopolymer was observed, and the obtained copolymer was homogeneous. The weight fraction of a soluble content in p-chlorophenol was 3% by weight. The results are shown in Table 5.

[Reference Example 5] Production Method of Polyphenylene Sulfide-Poly(Phenylene Ether Ether Ketone) Block Copolymer In a stainless steel autoclave equipped with an agitator, 51.9 g (0.18 mmol) of the polyphenylene sulfide component block (B-2) obtained in Reference Example 12, 20.0 g (0.18 mol) of the poly(phenylene ether ether ketone) component block (D-1) obtained in Reference Example 18 and 50 ml of N-methyl-2-pyrrolidone were mixed.

The reaction vessel was sealed in nitrogen gas at room temperature and ordinary pressure and was then heated from room temperature to 140° C. with stirring at 400 rpm and was kept at 140° C. for 1 hour. The reaction vessel was subsequently heated to 180° C. and was kept at 180° C. for 3 hours. The reaction vessel was further heated to 230° C. and was kept at 230° C. for 5 hours. The reaction vessel was then cooled down to room temperature, and the content was collected.

A slurry was prepared by adding 30 g of a 1 wt % acetic acid aqueous solution to an aliquot of 10 g of the obtained content with stirring, and was heated to 70° C. with stirring for 30 minutes. A solid substance was obtained by filtration of the slurry through a glass filter (average pore size of 10 to 16 μm). The series of operations of dispersing the obtained solid substance in 50 g of deionized water, stirring the dispersion at 70° C. for 30 minutes and filtering the dispersion to obtain a solid substance were repeated three times. A resulting solid substance was vacuum dried overnight at 70° C., so that a dried solid was obtained.

As the result of measurement of melting point and melt crystallization temperature with a differential scanning calorimeter, there were three melting points at 280° C., 286° C. and 335° C. and three melt crystallization temperatures at 220, 234 and 269° C. As the result of SEC measurement, there were three peaks derived from the polymer. In the ascending order of the molecular weight, the number-average molecular weight was 7,100, 10,400 and 17,700, and the maximum peak molecular weight was 9,900, 13,100 and 22,400. As the result of evaluation for the melt homogeneity with an optical microscope, coarse separated structure attributed to the homopolymer was observed, and the obtained copolymer was heterogeneous. The weight fraction of a soluble content in p-chlorophenol was 20% by weight. The results are shown in Table 5.

N-methyl-2-pyrrolidone and 25.11 g (0.09 mol) of the poly(phenylene ether ether ketone) component block (D-1) obtained in Reference Example 18, the reaction further proceeded for 30 minutes. The reaction vessel was then cooled down to room temperature, and the content was collected.

A slurry was prepared by adding 30 g of a 1 wt % acetic acid aqueous solution to an aliquot of 10 g of the obtained content with stirring, and was heated to 70° C. with stirring for 30 minutes. A solid substance was obtained by filtration of the slurry through a glass filter (average pore size of 10 to 16 μm). The series of operations of dispersing the obtained solid substance in 50 g of deionized water, stirring the dispersion at 70° C. for 30 minutes and filtering the dispersion to obtain a solid substance were repeated three times. A resulting solid substance was vacuum dried overnight at 70° C., so that a dried solid was obtained.

As the result of measurement of melting point with a differential scanning calorimeter, there were three melting points at 278° C., 304° C. and 336° C. and three melt crystallization temperatures at 220, 226 and 259° C. As the result of SEC measurement, there were three peaks derived from the polymer. In the ascending order of the molecular weight, the number-average molecular weight was 6,900, 12,300 and 15,300, and the maximum peak molecular weight was 11,100, 15,400 and 18,800. As the result of evaluation for the melt homogeneity with an optical microscope, coarse separated structure attributed to the homopolymer was observed, and the obtained copolymer was heterogeneous. The weight fraction of a soluble content in p-chlorophenol was 34% by weight. The results are shown in Table 5.

TABLE 5

| | PPS Component Block | | PEEK Component Block | | Ring-Opening Polymerization Initiator | Molecular Weight Distribution Profile | p-CP Soluble Content (wt %) | Melt Homogeneity |
|---|---|---|---|---|---|---|---|---|
| | | wt % | | wt % | | | | |
| EX 13 | A-2 | 92 | cPEEK | 8 | PhSNa | Unimodal | 0 wt % | Homogeneous |
| EX 14 | A-2 | 70 | cPEEK | 30 | PhSNa | Unimodal | 0 wt % | Homogeneous |
| EX 15 | A-3 | 70 | cPEEK | 30 | PhSNa | Unimodal | 0 wt % | Homogeneous |
| EX 16 | A-5 | 70 | cPEEK | 30 | NaSPhPhSNa | Unimodal | 0 wt % | Homogeneous |
| EX 17 | cPPS | 70 | C-5 | 30 | PhSNa | Unimodal | 10 wt % | Homogeneous |
| EX 18 | A-2 | 50 | cPEEK | 50 | PhSNa | Unimodal | 0 wt % | Homogeneous |
| EX 19 | cPPS | 30 | cPEEK | 70 | PhSNa | Unimodal | 3 wt % | Homogeneous |
| COMP EX 5 | B-2 | 72 | D-1 | 28 | — | 3-Peak | 20 wt % | Heterogeneous |
| COMP EX 6 | — | | 50 | D-1 | 50 | — | 3-Peak | 34 wt % | Heterogeneous |

* PPS: polyphenylene sulfide, PEEK: poly(phenylene ether ether ketone) p-CP: p-chlorophenol, PhSNa: sodium thiophenoxide NaSPhPhSNa: disodium salt of 4,4'-biphenyldithiol

[Reference Example 6] Production Method of Polyphenylene Sulfide-Poly(Phenylene Ether Ether Ketone) Block Copolymer In a stainless steel autoclave equipped with an agitator, 28.06 g (0.24 mol) of a 48 wt % sodium hydrosulfide aqueous solution, 25.00 g (0.29 mol) of a 48 wt % sodium hydroxide aqueous solution prepared from 96% sodium hydroxide, 120 mL of N-methyl-2-pyrrolidone and 33.81 g (0.23 mol) of p-dichlorobenzene were mixed.

After the reaction vessel was sealed in nitrogen gas at room temperature and ordinary pressure, the reaction vessel was heated to 210° C. with stirring at 400 rpm and was kept at 210° C. for 3 hours. The reaction vessel was subsequently heated to 260° C. and was kept at 260° C. for 10 minutes. After addition of a slurry obtained by mixing 10 mL of According to the results of the foregoing, the copolymer including the polyarylene sulfide component block prepared from the cyclic polyarylene sulfide as the raw material and the block prepared from the cyclic compound other than the cyclic polyarylene sulfide as the raw material is identified as a block copolymer of extremely homogeneous composition, since its chromatogram in SEC measurement is unimodal and no coarse phase separated structure derived from the homopolymer is observed in measurement in the molten state with an optical microscope. This may be attributed to that the reactive terminal group is introduced quantitatively into the polyarylene sulfide component block by using the cyclic compound as the raw material. Such advantageous effect is not obtained in a polyarylene sulfide component block prepared from a non-cyclic compound as the raw material, and a resulting copolymer has heterogeneous composition.

The invention claimed is:

1. A production method of a block copolymer, comprising:
   (a) step of ring-opening polymerization of a cyclic polyarylene sulfide in the presence of an initiator; and
   (b) step of ring-opening polymerization of a cyclic compound different from the cyclic polyarylene sulfide by mixing the product obtained in step (a) with the cyclic compound different from the cyclic polyarylene sulfide.

2. The production method of the block copolymer according to claim 1, wherein the cyclic compound used in step (b) is one cyclic compound selected from the group consisting of a cyclic amide, a cyclic ester, a cyclic polycarbonate, a cyclic polysulfone and a cyclic poly(phenylene ether ether ketone).

3. The production method of the block copolymer according to claim 2, wherein the cyclic compound used in step (b) is a cyclic poly(phenylene ether ether ketone).

4. The production method of the block copolymer according to claim 1, wherein the initiator used in step (a) is a metal salt.

5. The production method of the block copolymer according to claim 1, wherein the ring-opening polymerization proceeding in step (a) and step (b) is anionic ring-opening polymerization.

6. A production method of a block copolymer, comprising:
   (b) step of ring-opening polymerization of a cyclic compound different from a cyclic polyarylene sulfide in the presence of an initiator; and
   (a) step of ring-opening polymerization of a cyclic polyarylene sulfide by mixing the product obtained in step (b) with the cyclic polyarylene sulfide.

7. The production method of the block copolymer according to claim 6, wherein the cyclic compound used in step (b) is one cyclic compound selected from the group consisting of a cyclic amide, a cyclic ester, a cyclic polycarbonate, a cyclic polysulfone and a cyclic poly(phenylene ether ether ketone).

8. The production method of the block copolymer according to claim 7, wherein the cyclic compound used in step (b) is at least one selected from the group consisting of a cyclic amide, a cyclic ester, a cyclic polycarbonate and a cyclic polysulfone.

9. The production method of the block copolymer according to claim 6, wherein the initiator used in step (b) is a metal salt.

10. The production method of the block copolymer according to claim 6, wherein the ring-opening polymerization proceeding in step (a) and step (b) is anionic ring-opening polymerization.

* * * * *